US010023031B2

(12) United States Patent
Atomura et al.

(10) Patent No.: US 10,023,031 B2
(45) Date of Patent: Jul. 17, 2018

(54) PULLEY APPARATUS

(71) Applicant: Mitsuba Corporation, Gunma (JP)

(72) Inventors: Tatsuya Atomura, Gunma (JP);
Yoshitaka Urano, Gunma (JP);
Mitsuhiro Okada, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days.

(21) Appl. No.: 14/432,890

(22) PCT Filed: Oct. 11, 2013

(86) PCT No.: PCT/JP2013/077791
§ 371 (c)(1),
(2) Date: Apr. 1, 2015

(87) PCT Pub. No.: WO2014/061599
PCT Pub. Date: Apr. 24, 2014

(65) Prior Publication Data
US 2015/0251525 A1    Sep. 10, 2015

(30) Foreign Application Priority Data

Oct. 15, 2012 (JP) .................... 2012-227884
Nov. 22, 2012 (JP) .................... 2012-255860

(51) Int. Cl.
B60J 5/06       (2006.01)
E05F 15/643    (2015.01)
(Continued)

(52) U.S. Cl.
CPC ............ B60J 5/06 (2013.01); E05D 15/1042 (2013.01); E05F 11/54 (2013.01); E05F 15/643 (2015.01);
(Continued)

(58) Field of Classification Search
CPC . B60J 5/06; E05F 11/54; E05F 15/643; E05Y 2201/66
(Continued)

(56) References Cited

U.S. PATENT DOCUMENTS 4,835,907 A * 6/1989 Heuchert .............. E05F 11/486
                                                    49/352
6,152,519 A * 11/2000 Blank .................. E05F 15/646
                                                    296/155
7,708,334 B2 * 5/2010 Yamada ................ E05F 15/646
                                                    296/146.4
(Continued)

FOREIGN PATENT DOCUMENTS

DE      196 07 527      *  8/1996
JP      2004124556 A       4/2004
(Continued)

OTHER PUBLICATIONS

International Search Report for PCT/JP2013/077791 dated Dec. 12, 2013.

Primary Examiner — Gregory J Strimbu
(74) Attorney, Agent, or Firm — McCormick, Paulding & Huber LLP

(57) ABSTRACT

A pulley apparatus has: a pulley case (CA) disposed on one side of a vehicle body panel (11a) forming part of the vehicle; a pulley (80) disposed rotatable in the pulley case (CA); and a cable guide disposed in the pulley case (CA), wherein the cable guide is in sliding contact with a cable (18) which is led into an interior of the vehicle through the vehicle body panel (11a), and guides the cable (18) along vehicle body panel (11a) to direct the cable (18) to the pulley (80). As a result, when a load is applied to the cable (18), a case body of the pulley case (40) is pressed against the vehicle body panel (11a), thereby suppressing rattling noise and vibration of the pulley case (CA).

13 Claims, 18 Drawing Sheets

(51) Int. Cl.
  *E05F 11/54* (2006.01)
  *E05D 15/10* (2006.01)
  *E05F 15/646* (2015.01)
  *E05F 15/655* (2015.01)

(52) U.S. Cl.
  CPC .......... *E05F 15/646* (2015.01); *E05F 15/655* (2015.01); *E05D 2015/1055* (2013.01); *E05Y 2201/10* (2013.01); *E05Y 2201/654* (2013.01); *E05Y 2201/66* (2013.01); *E05Y 2201/668* (2013.01); *E05Y 2600/53* (2013.01); *E05Y 2800/422* (2013.01); *E05Y 2900/531* (2013.01)

(58) Field of Classification Search
  USPC .......................................................... 49/360
  See application file for complete search history.

(56) References Cited

U.S. PATENT DOCUMENTS

| | | | | |
|---|---|---|---|---|
| 2004/0221511 A1* | 11/2004 | Rogers, Jr. | ............ | E05F 15/643 49/360 |
| 2008/0244982 A1* | 10/2008 | Azuma | ................ | E05F 15/646 49/352 |
| 2010/0180508 A1* | 7/2010 | Yamaguchi | ................ | B60J 5/06 49/358 |

FOREIGN PATENT DOCUMENTS

| JP | 2005213831 A | 8/2005 |
|---|---|---|
| JP | 2012122302 A | 6/2012 |
| JP | 5213776 * | 6/2013 |

* cited by examiner

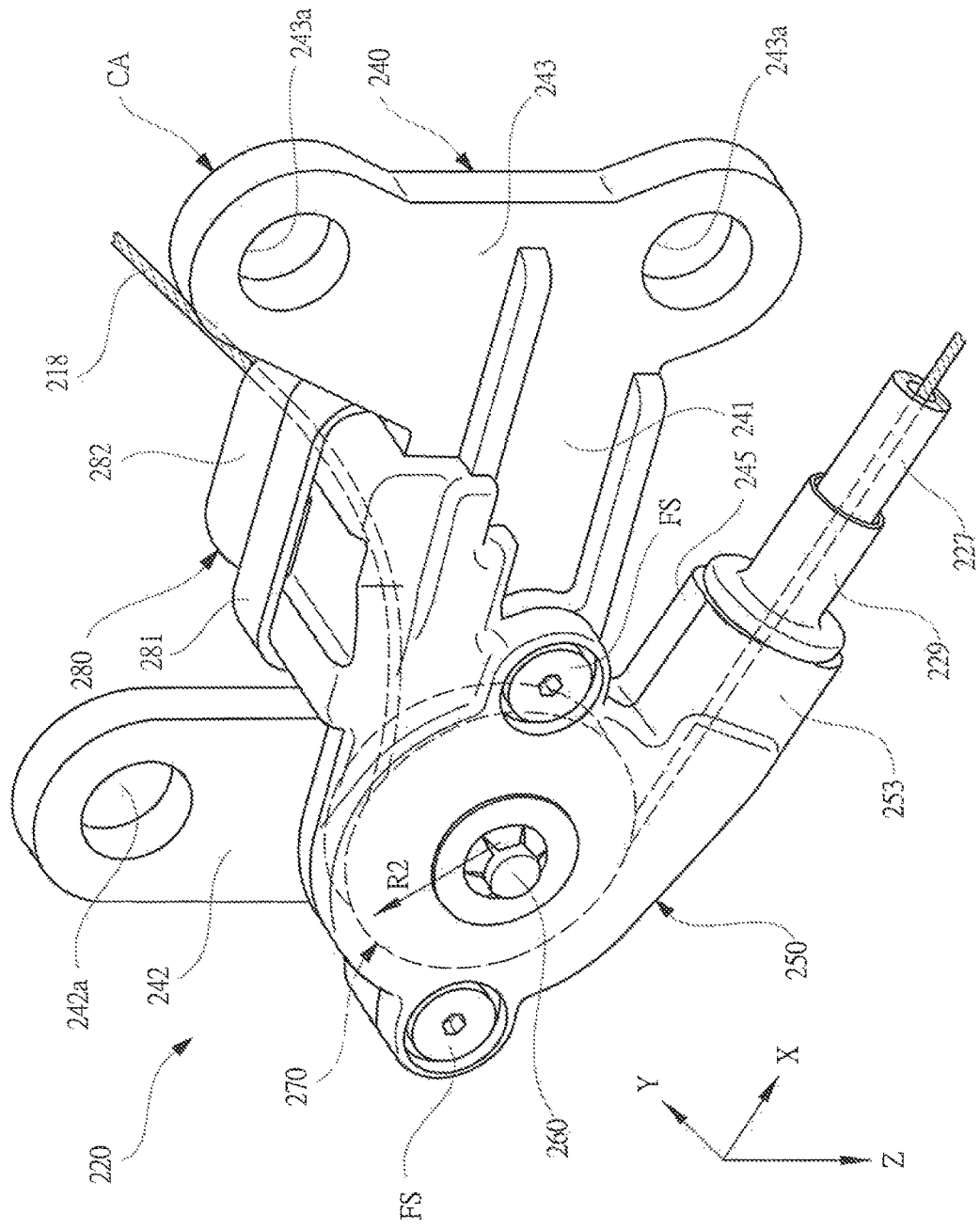

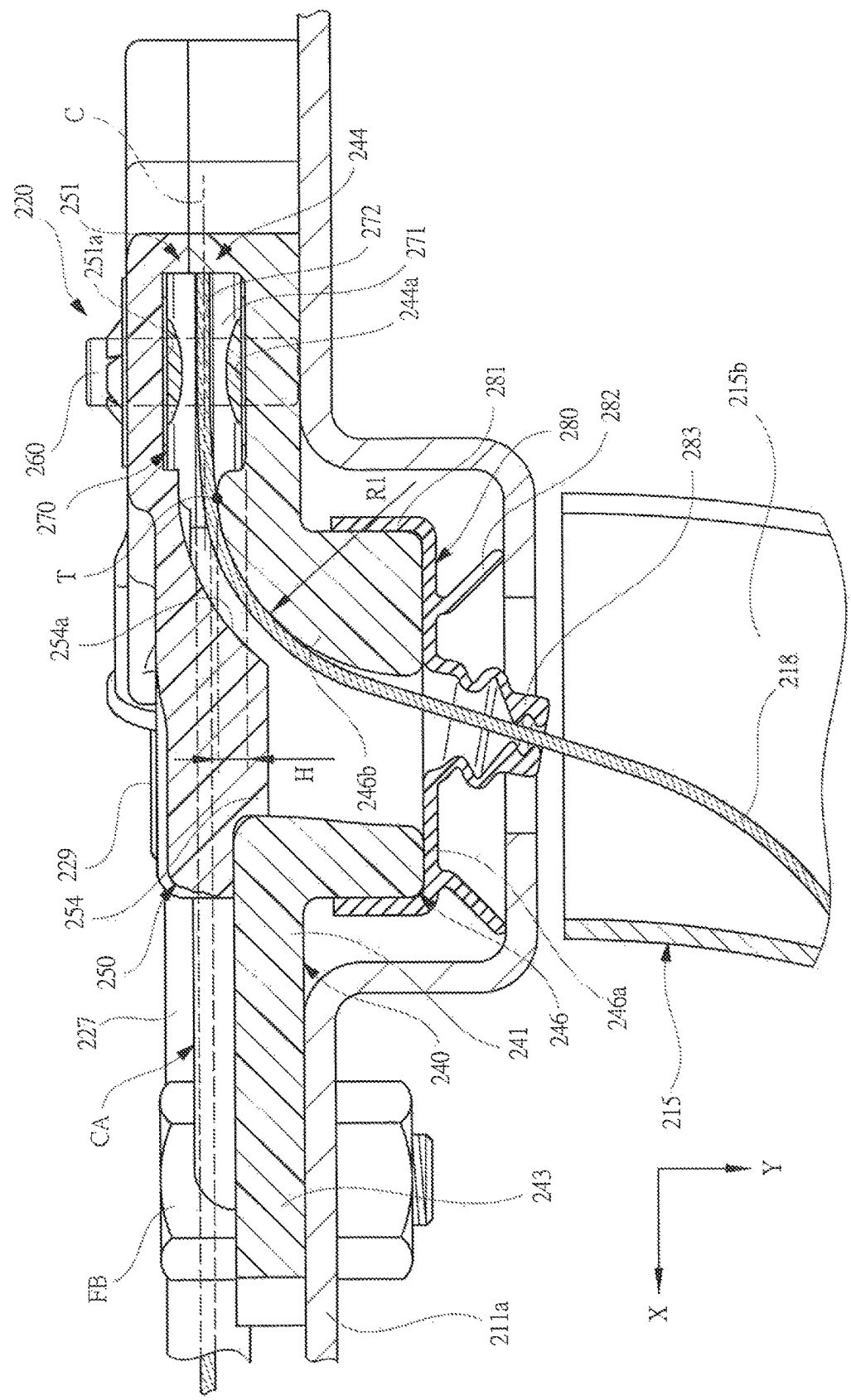

PULLEY APPARATUS

CROSS REFERENCE TO RELATED APPLICATION

Applicant hereby claims foreign priority benefits under U.S.C. § 119 from Japanese Patent Application No. JP2012-227884 filed on Oct. 15, 2012 and from Japanese Patent Application No. JP2012-255860 filed on Nov. 22, 2012, and from PCT/JP2013/077791 filed on Oct. 11, 2013 the contents of all of which are incorporated by reference herein.

TECHNICAL FIELD OF THE INVENTION

The present invention relates to a pulley apparatus forming part of a slide door opening and closing mechanism for opening and closing a slide door disposed on one side of a vehicle, which converts the pulling direction of a cable which pulls the slide door.

BACKGROUND OF THE INVENTION

Conventionally, such a vehicle as station wagon and minivan has a relatively large opening section formed on one side of the vehicle for allowing an occupant to easily getting on and off the vehicle and carry a luggage in and out of the vehicle. The opening section is opened and closed with a slide door having a roller assembly. Since such a slide door is heavy, the vehicle having the slide door is equipped with a slide door opening and closing mechanism which can automatically open and close the slide door.

The slide door opening and closing mechanism has a guide rail along which the roller assembly rolls to guide the slide door on move. The guide rail is disposed near the opening section and extends in the front-to-rear direction of the vehicle. On the vehicle-front-side of the guide rail, a guide-in portion is formed, which is curved from the side of the vehicle toward the interior of the vehicle to form a guide-in track. As a result, when the slide door is about to be fully closed, the roller assembly rolls along the guide-in portion, which causes the slide door to slide into the opening section, thus putting the slide door in a fully closed state.

A pulley apparatus is disposed on the vehicle-front-side of the guide rail and on the vehicle-rear-side of the same, the pulley apparatus changing the pulling direction of a cable which pulls the slide door in an opening direction and a closing direction. The pulley apparatus changes the direction the cable to direct it toward the center of the guide rail, and the cable whose direction is changed by the pulley apparatus is wound around a drum of a drive unit disposed on the vehicle. The drive unit is driven to rotate the drum clockwise or counterclockwise, which causes the cable to pull the slide door in the opening direction or the closing direction.

A technique described in Japanese Patent Application Laid-Open Publication No. 2005-213831 (FIGS. 4 and 6) is known as a technique related to such a slide door opening and closing mechanism. According to the technique described in Japanese Patent Application Laid-Open Publication No. 2005-213831, a guide-in portion (front side) of a guide rail is provided with a pulley assembly (pulley apparatus), which has a pulley case fixed to a vehicle body (vehicle body panel). The pulley case has a resin case body. A pulley housing portion housing a pulley therein is formed on one side of the case body along its lengthwise direction, while a fitting portion for fixing the pulley case to the vehicle body is formed on the other end of the case body along its lengthwise direction.

The fitting portion of the case body is fitted to a stepped part of the vehicle body with a bolt and a nut so that the pulley case in its almost cantilevered position is anchored to the vehicle body. This means that the pulley housing portion of the case body is not fixed to the vehicle body. Between the pulley housing portion and the vehicle body, a rubber cover is disposed to cover a wire inlet/outlet, preventing entry of rainwater, etc., into the pulley case.

SUMMARY

According to the pulley apparatus described in Japanese Patent Application Laid-Open Publication No. 2005-213831, the case body of the pulley case in its almost cantilevered position is anchored to the vehicle body and the cover does not contribute to an improvement in the strength of fixation of the case body to the vehicle body. This leads to a problem that the case body is distorted when a large load, such as the slide resistance of the slide door, is applied to the pulley. In this case, repeated distortion of the case body may loosen the bolt and nut with which the pulley case is anchored to the vehicle body. As a result, to suppress shakiness, for example, rattling noise and vibration resulting from attachment structure of the pulley apparatus, maintenance work must be carried out frequently. One conceivable solution to this problem is to provide additional fitting portion in a location opposite to the existing fitting portion across the pulley housing portion. This case, however, leads to an increase in the size of the case body and in the number of bolts and nuts, thus leading to inferior workability in fitting the pulley case to the vehicle body, which is another problem to solve.

An object of the present invention is to provide a pulley apparatus which can suppress rattling noise and vibration thereof without reducing workability in fitting the pulley apparatus to a vehicle body.

A pulley apparatus of the present invention forming part of a slide door opening and closing mechanism which opens and closes a slide door disposed on a side of a vehicle and changes the pulling direction of a cable which pulls the slide door. The pulley apparatus comprises a pulley case disposed on one side of a vehicle body panel forming part of the vehicle; a pulley disposed rotatable in the pulley case, the pulley having a pulley groove into which the cable is guided in; and a cable guide disposed in the pulley case, the cable guide guiding the cable led from the other side to the one side of the vehicle body panel and being in sliding contact with the cable guide and curving the cable along vehicle body panel to direct the cable to the pulley.

According to the pulley apparatus of the present invention, the pulley is disposed in the pulley case such that the axial direction of the pulley matches the thickness direction of the vehicle body panel.

The pulley apparatus of the present invention comprises a pulley shaft so supporting the pulley as to allow it to rotate freely. According to the pulley apparatus, the position of top of the cable guide along the axial direction of the pulley shaft is set to be the position at which the cable guide guides the cable to the central position of the pulley groove along the axial direction of the pulley shaft.

According to the pulley apparatus of the present invention, the cable guide is disposed closer to the pulley than a fitting portion of the pulley case along the vehicle body panel for fitting the pulley case to the vehicle body panel.

According to the pulley apparatus of the present invention, the pulley case includes a case body fixed to the vehicle body panel and a case cover closely covering up the case body. The cable guide is an arcuate projection formed on the case body, and an arcuate recession that guides the cable along the arcuate projection is formed on a part of the case cover that is counter to the arcuate projection.

According to the pulley apparatus of the present invention, the radius of curvature of the arcuate projection is set to be equal to the radius of curvature of the pulley groove.

The pulley apparatus of the present invention comprises a pulley case disposed on one side of a vehicle body panel forming part of a vehicle; a pulley disposed rotatable in the pulley case; and a cable guide disposed in the pulley case, the cable guide guiding a cable led from the other side to one side of the vehicle body panel and coming in slide contact with the cable guide and curving the cable along vehicle body panel to direct the cable to the pulley. The pulley apparatus having this configuration can direct a load applied to the cable toward the vehicle body panel via the cable guide. As a result, when a slide door opening and closing mechanism is driven, that is, when a load is applied to the cable, the pulley case is pressed against the vehicle body panel, which suppresses rattling noise and vibration of the pulley case. Since the load applied to the cable presses the pulley case against the vehicle body panel, providing an additional fitting portion for fixing the pulley case to the vehicle body panel is unnecessary. This prevents an increase in the size of the pulley case and reduction of workability in fitting the pulley case to the vehicle body.

According to the pulley apparatus of the present invention, the pulley is disposed in the pulley case such that the axial direction of the pulley matches the thickness direction of the vehicle body panel. As a result, the pulley apparatus can be disposed along the vehicle body panel in such a compact manner that the pulley apparatus does not project significantly from the vehicle body panel.

According to the pulley apparatus of the present invention, the position of top of the cable guide along the axial direction of a pulley shaft is set to be the position at which the cable guide guides the cable to the central position of a pulley groove along the axial direction of the pulley shaft. This allows the cable to be guided from the cable guide to the normal position of the pulley groove. As a result, the cable hardly comes in slide contact with part of the pulley other than the pulley groove, which suppresses the partial wear, etc., of the pulley caused by its contact with the cable. In addition, the cable is moved smoothly. As a result, noise emission is suppressed and application of a large load to a drive unit is surely prevented.

According to the pulley apparatus of the present invention, the cable guide is disposed closer to the pulley than a fitting portion of the pulley case along the vehicle body panel for fitting the pulley case to the vehicle body panel. Forming the fitting portion of the pulley case closer to the pulley, therefore, becomes unnecessary.

According to the pulley apparatus of the present invention, the pulley case includes a case body fixed to the vehicle body panel and a case cover closely covering up the case body. The cable guide is an arcuate projection formed on the case body, and an arcuate recession that guides the cable along the arcuate projection is formed on a part of the case cover that is counter to the arcuate projection. This configuration facilitates insertion of the cable in between the arcuate projection and the arcuate recession, thereby improves easiness in attaching the cable to the pulley apparatus.

According to the pulley apparatus of the present invention, the radius of curvature of the arcuate projection is set to be equal to the radius of curvature of the pulley groove. This prevents excessive bending of the cable and an unnecessary increase in the size of the pulley case.

BRIEF DESCRIPTION OF THE DRAWINGS

FIG. 14 is an enlarged view showing a pulley apparatus on the front side of the vehicle;

FIG. 15 is a sectional view along a longitudinal direction and a width direction of the vehicle, explaining an inner structure of the pulley apparatus.

DESCRIPTION OF THE PREFERRED EMBODIMENTS

First Embodiment

Hereinafter, the first embodiment of the present invention will be described in detail with reference to the attached drawings.

Figure 1:
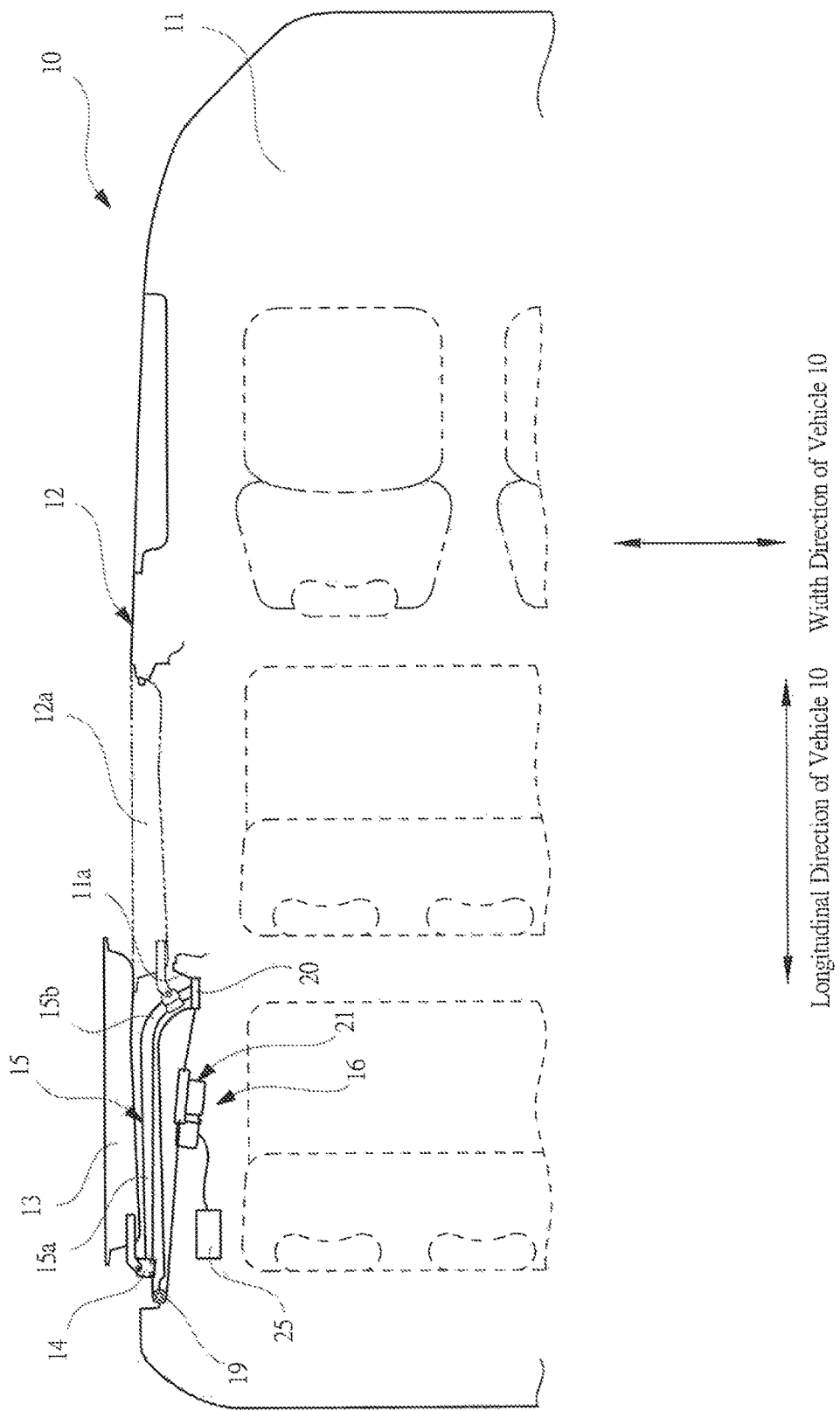
FIG. 1 is a view schematically showing a vehicle mounted with a slide door opening and closing mechanism having a pulley apparatus.
Figure 2:
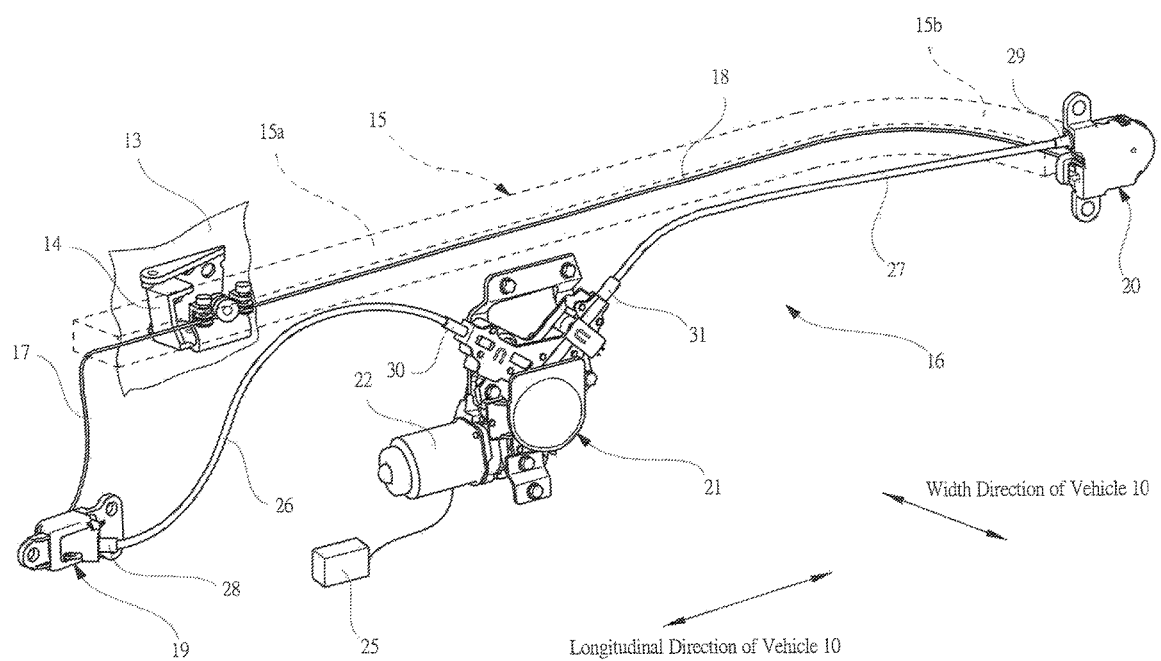
FIG. 2 is a perspective view showing the slide door opening and closing mechanism of FIG. 1.
Figure 3:
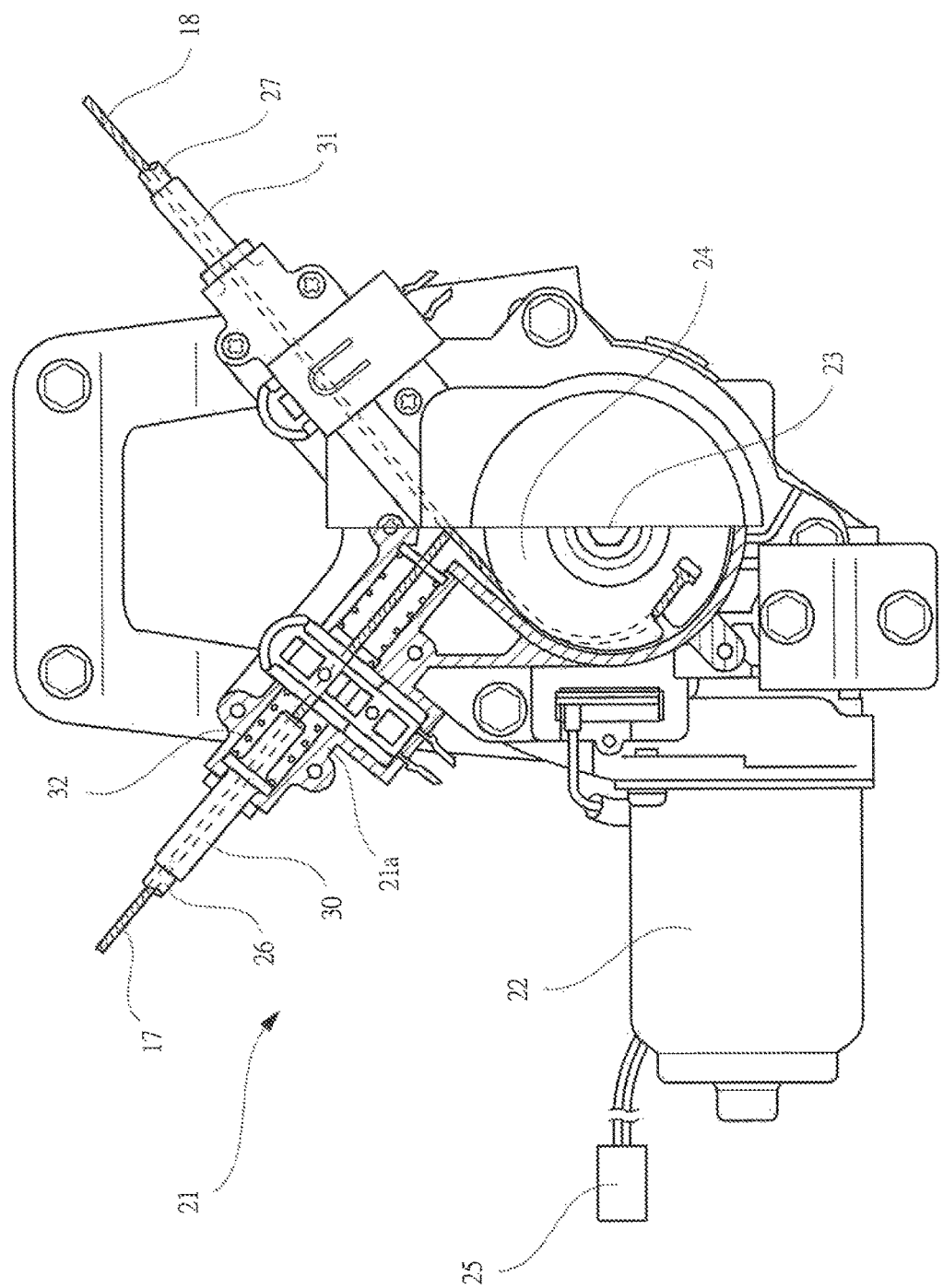
FIG. 3 is a fragmentary sectional view showing a drive unit of the slide door opening and closing mechanism of FIG. 2.

FIG. 1 is a view schematically showing a vehicle mounted with a slide door opening and closing mechanism having a pulley apparatus, FIG. 2 is a perspective view showing the slide door opening and closing mechanism of FIG. 1, and FIG. 3 is a fragmentary sectional view showing a drive unit of the slide door opening and closing mechanism of FIG. 2.

As shown in FIG. 1, a vehicle 10 is a car known as minivan. On one side 12 of a vehicle body 11 forming part of the vehicle 10, a slide door 13 is disposed, which opens and closes an opening section 12a famed on the side 12. The slide door 13 has a roller assembly 14, which is guided by a guide rail 15 so disposed on the vehicle body 11 as to extend in the front-to-rear direction of the vehicle 10. In other words, the slide door 13 is guided by the guide rail 15 to move in the front-to-rear direction of the vehicle 10.

The guide rail 15 has a linear portion 15a extending in the front-to-rear direction of the vehicle 10 and a guide-in portion 15b extending in the width direction of the vehicle 10, i.e., the direction crossing the front-to-rear direction of the vehicle 10 (vertical direction in FIG. 1). The guide-in portion 15b is located closer to the front of the vehicle 10, that is, closer to the opening section 12a than the linear portion 15a, and is curved from the side 12 toward the interior (compartment) of the vehicle 10 to form a guide-in track. The guide-in portion 15b is of an almost arcuate shape. As a result, when the slide door 13 is about to be fully closed, the roller assembly 14 rolls along the guide-in portion 15b, which causes the slide door to slide into the opening section 12a, thus putting the slide door in a fully closed state (see a two-dot chain line in FIG. 1).

The vehicle body 11 is equipped with a slide door opening and closing mechanism 16 which opens and closes the slide door 13. As shown in FIG. 2, the slide door opening and closing mechanism 16 has a pair of cables 17 and 18 whose respective one ends are connected to the roller assembly, a pair of pulley apparatuses 19 and 20 which change the direction of the cables 17 and 18, i.e., direction of movement of the cables 17 and 18 on the rear side of guide rail 15 that is closer to the rear of the vehicle 10 and the front side of guide rail 15 that is closer to the front of the vehicle 10, respectively, and a drive unit 21 that pulls the cables 17 and 18. The drive unit 21 is situated in the approximate center along the lengthwise direction of the guide rail 15, and is fixed to the compartment side of a vehicle body panel 11a (see FIGS. 1, 4, and 5) forming part of the vehicle body 11.

As shown in FIG. 3, the drive unit 21 has an electric motor 22 serving as a driving source. Output from the electric motor 22 is transmitted to an output shaft 23 via a speed-reducing mechanism (not shown). To the output shaft 23, an almost cylindrical drum 24 is fixed, which is rotated when the rotation of the electric motor 22 is transmitted to the drum 24 via the speed-reducing mechanism and the output shaft 23. To the drum 24, the other ends of the cables 17 and 18 are fixed. A helical groove for cable winding (not shown) is formed on the outer periphery of the drum 24, and the cables 17 and 18 guided to the drive unit 21 are so wound along the helical groove that the cables 17 and 18 are turned several times in directions reverse to each other.

When the drum 24 is rotated clockwise in FIG. 3, the opening-side cable 17 is reeled onto the drum 24 as the closing-side cable 18 is sent out from the drum 24. The slide door 13 is thus pulled by the opening-side cable 17 to automatically make an opening movement. In contrast, when the drum 24 is rotated counterclockwise in FIG. 3, the closing-side cable 18 is reeled onto the drum 24 as the opening-side cable 17 is sent out from the drum 24. The slide door 13 is thus pulled by the closing-side cable 18 to automatically make a closing movement.

For example, a motor capable of rotating clockwise and counterclockwise, such as a DC motor with a brush, is used as the electric motor 22. The rotation of the electric motor 22 is controlled by a control unit 25 having a CPU, memory, etc.

As shown in FIG. 2, the rear-side pulley apparatus 19 is disposed on the rear side of the linear portion 15a of the guide rail 15 that is closer to the rear of the vehicle 10. The rear-side pulley apparatus 19 is fixed to the vehicle body panel 11a with a fastening bolt, etc. (not shown). The pulley apparatus 19 changes the direction of the opening-side cable 17 by about 180 degrees, and guides the other end of the cable 17 turned back on the rear side of the vehicle 10 to the drive unit 21 while guides the one end of the cable 17 to the roller assembly 14.

On the side of the guide-in portion 15b of the guide rail 15 that is closer to the compartment of the vehicle 10, the front-side pulley apparatus 20 is disposed to be counter to the guide-in portion 15b in the width direction of the vehicle 10. The pulley apparatus 20 is fixed to the vehicle body panel 11a with a fastening bolt, etc. (not shown). The pulley apparatus 20 changes the direction the closing-side cable 18 by about 90 degrees, and guides the other end of the cable 18 turned back on the front side of the vehicle 10 to the drive unit 21 while guides one end of the cable 18 to the roller assembly 14.

The angles of change of the directions of the cables 17 and 18 by the pulley apparatuses 19 and 20 are set according to a mounting space for mounting the slide door opening and closing mechanism 16 on the vehicle body 11. Each of the cable 17 and 18 has its surface coated with a rust preventive resin material (not shown).

Between the drive unit 21 and the pulley apparatus 19 and between the drive unit 21 and the pulley apparatus 20, a pair of outer tubes 26 and 27 are provided, which so sheathe the cables 17 and 18 that they are slidable in the outer tubes, respectively. Each of the outer tubes 26 and 27 is made up of a metal layer and a resin layer and is flexible. To one ends of the outer tubes 26 and 27, resin caps 28 and 29 are attached, which guide the cables 17 and 18 from the pulley apparatuses 19 and 20 that enter and exit the outer tubes 26 and 27, respectively. The one ends of the outer tubes 26 and 27 are fixed to the pulley apparatuses 19 and 20 via the caps 28 and 29, respectively.

To the other ends of the outer tubes 26 and 27, as shown in FIG. 3, resin slide caps 30 and 31 are fixed, respectively, such that the slide caps 30 and 31 proceed and retreat freely to and from the unit case 21a of the drive unit 21. The slide caps 30 and 31 are kept pushed in the direction of pushing them out of the unit case 21a, by springs 32 placed in the unit case 21a, respectively. As a result, the outer tubes 26 and 27 are pushed out of the unit case 21a and are curved between the drive unit 21 and the pulley apparatus 19 and between the drive unit 21 and the pulley apparatus 20, respectively.

Curving the outer tubes 26 and 27 extends respective travel routes of the cables 17 and 18 between the drive unit 21 and the pulley apparatus 19 and between the drive unit 21 and the pulley apparatus 20 and provides the cables 17 and 18 with a given tension. In other words, by curving the outer tubes 26 and 27 by the push of the springs 32, the cables 17 and 18 are rid of their slacks.

The structure of the front-side pulley apparatus 20 to which the present invention applies will then be described in detail, referring to drawings. In this embodiment, as shown in FIG. 2, the front-side pulley apparatus 20 and the rear-side pulley apparatus 19 are different in structure from each other. However, the rear-side pulley apparatus 19 and the front-side pulley apparatus 20 may have the same configuration and the present invention applies also to such pulley apparatuses 19 and 20.

Figure 4:
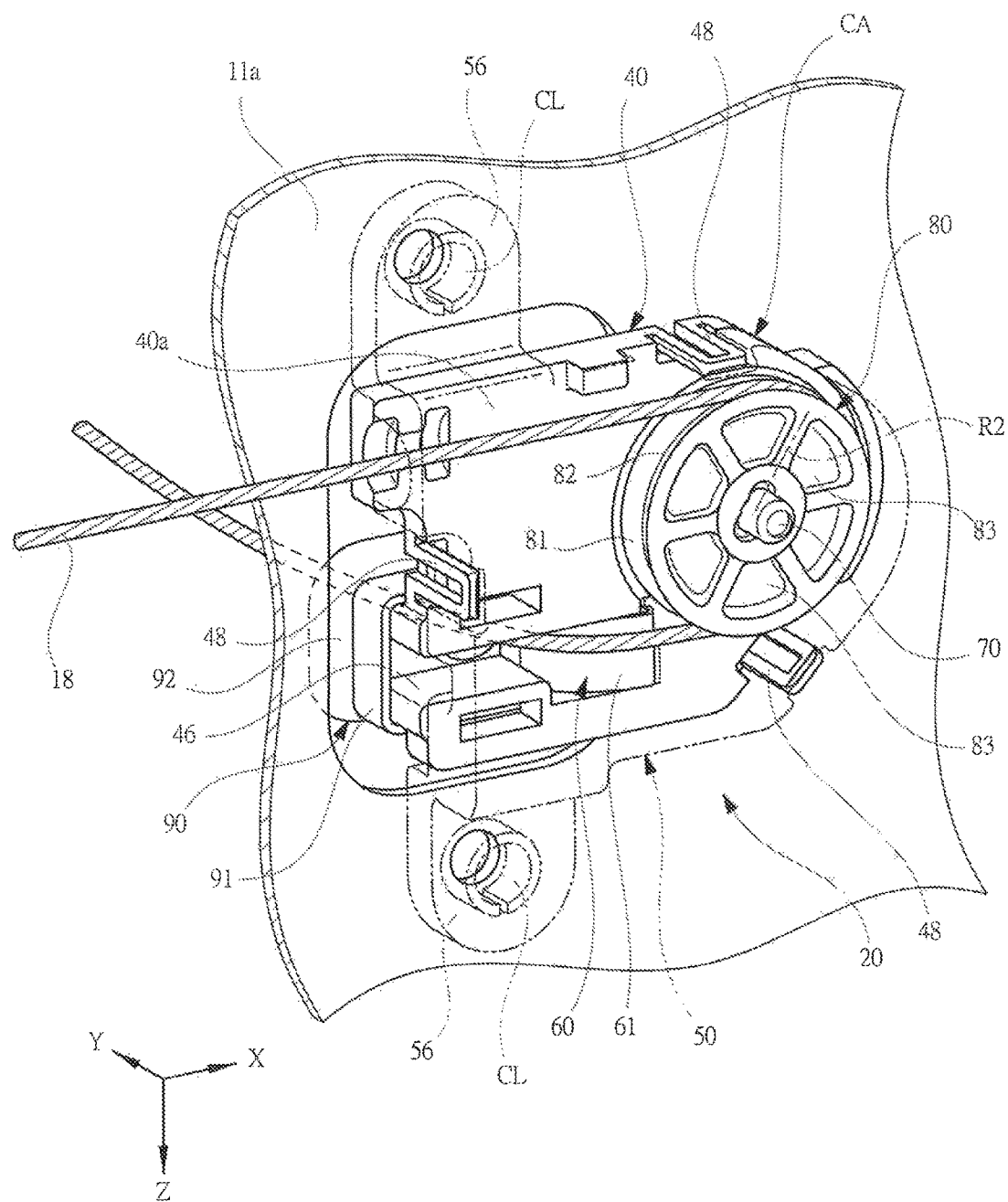
FIG. 4 is an enlarged view showing a pulley apparatus on the front side of the vehicle.
Figure 5:
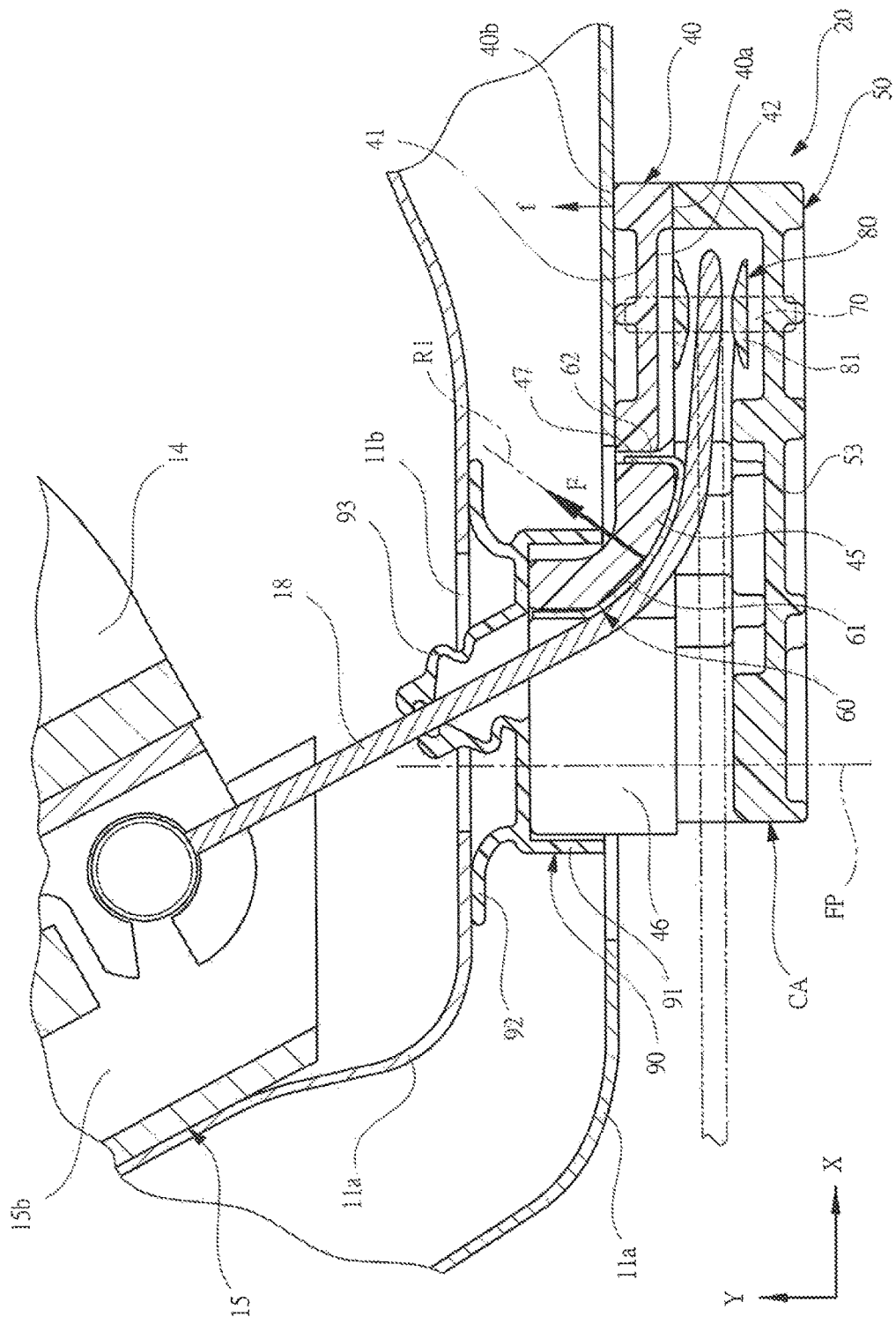
FIG. 5 is a sectional view along a longitudinal direction and a width direction of the vehicle, explaining an inner structure of the pulley apparatus.
Figure 6A:
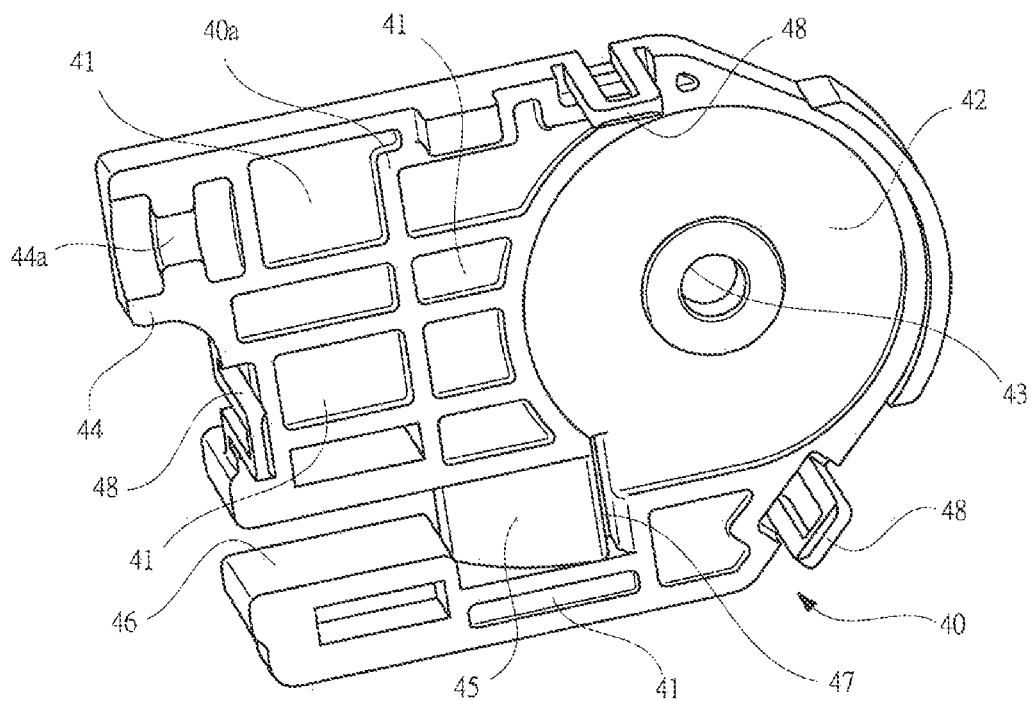
FIGS. 6A and 6B are perspective views showing a front side and a rear side of a case body forming part of the pulley apparatus.
Figure 6B:
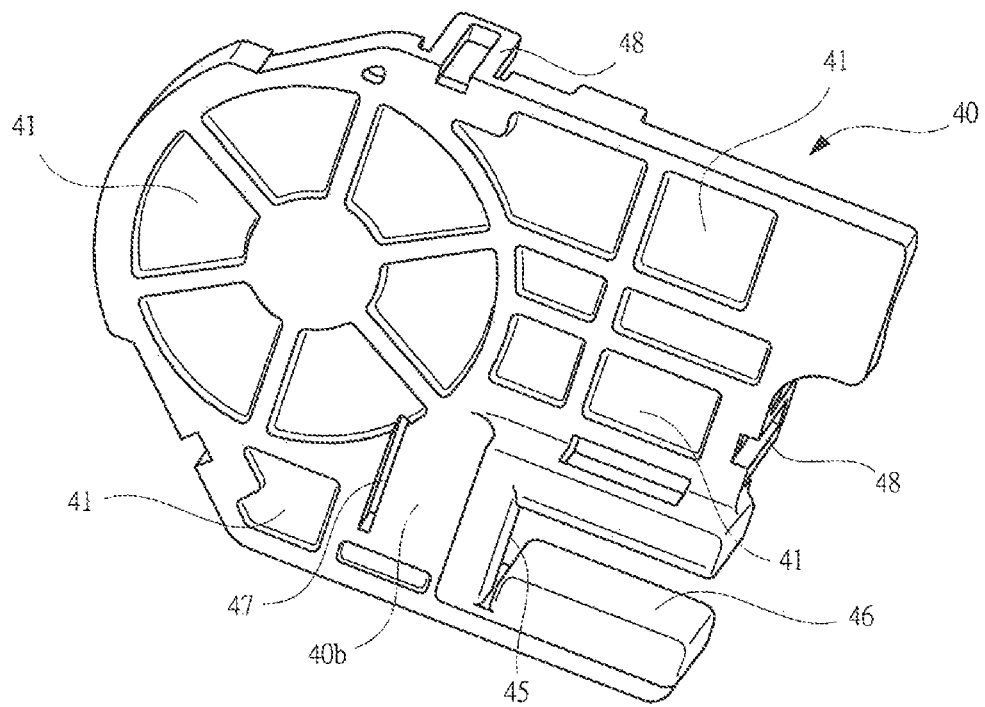
Figure 7A:
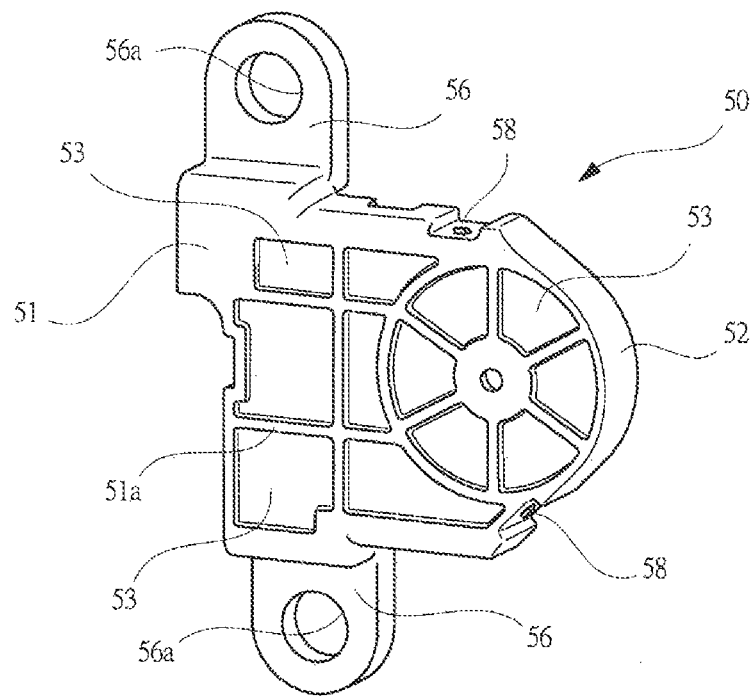
FIGS. 7A and 7B are perspective views showing a front side and a rear side of a case cover forming part of the pulley apparatus.
Figure 7B:
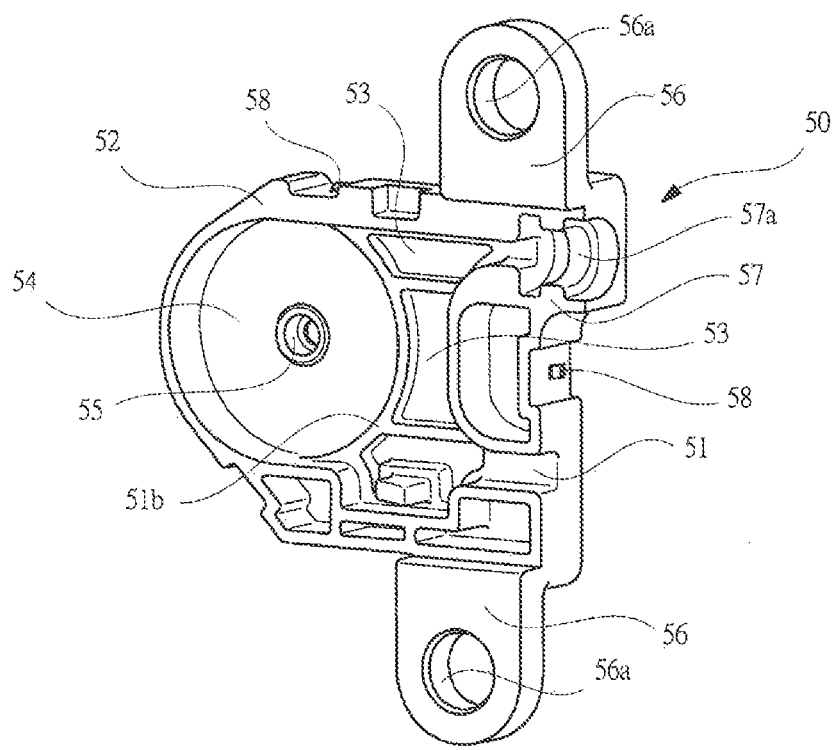

FIG. 4 is an enlarged perspective view of the pulley apparatus closer to the vehicle front side, FIG. 5 is a sectional view of the pulley apparatus of FIG. 4 along the front-to-rear direction and width direction of the vehicle for explaining the internal structure of the pulley apparatus, FIGS. 6A and 6B are perspective views showing the front side and back side of the case body forming part of the pulley apparatus, respectively, and FIGS. 7A and 7B are perspective views showing the front side and back side of the case cover forming part of the pulley apparatus, respectively.

As shown in FIGS. 4 and 5, the pulley apparatus 20 is disposed on the compartment side (one side) of the vehicle body panel 11a, and changes the direction of the cable 18 guided from the guide rail 15 side (the other side) of the vehicle body panel 11a to the compartment side through an opening 11b formed on the vehicle body panel 11a, by about 90 degrees. Specifically, the pulley apparatus 20 changes the direction of movement of the cable 18 from the direction of movement along the guide-in portion 15b of the guide rail 15 (Y-axis direction) to the direction of movement toward the drive unit 21 (X-axis direction). The pulley apparatus 20 has a resin case body 40, a resin case cover 50, a metal guide member 60, a metal pulley shaft 70, a resin pulley 80, and a rubber seal cover 90.

In FIG. 4, to facilitate understanding of the internal structure of the pulley apparatus 20, the case cover 50 is depicted by a two-dot chain line (virtual line) and multiple thickness-reduced portions 41 formed on the surface 40a of the case body 40 (see FIGS. 6A and 6B) are not shown.

The case body 40 is assembled together with the case cover 50 to form a pulley case CA, and is made into a tabular shape by injection molding a resin material, such as plastic. As shown in FIGS. 6A and 6B, multiple thickness-reduced portions (dented portions) 41 are formed on both surfaces, i.e., the surface 40a and the back surface 40b of the case body 40. Forming the multiple thickness-educed portions 41 in this manner reduces the weight of the case body 40 and prevents the defamation of the case body 40 caused by "sink marks" resulting from the injection molding.

On one side of the case body 40 along its lengthwise direction (right side in FIG. 6A), a first pulley housing portion 42 is famed, in which the pulley 80 is housed when the case cover 50 is fitted to the case body 40. The first pulley housing portion 42 is almost disc-shaped, and is dented in the thickness direction of the case body 40 in the same manner as the thickness-reduced portions 41. A fitting hole 43 is formed in the approximate center of the first pulley housing portion 42, and one end of the pulley shaft 70 so supporting the pulley 80 as to allow it rotate is fitted in the fitting hole 43.

By fixing the pulley shaft 70 to the fitting hole 43 in this manner, when the pulley apparatus 20 is fixed to the vehicle body panel 11a, the axial direction of the pulley 80 matches the width direction of the vehicle 10 (Y-axis direction), i.e., thickness direction of the vehicle body panel 11a and therefore the radial direction of the pulley 80 is matched to the front-to-rear direction of the vehicle 10 (X-axis direction), as shown in FIGS. 4 and 5. The z-axis direction in FIGS. 4 and 5 corresponds to the vertical direction of the vehicle 10.

On the other side of the case body 40 along its lengthwise direction (left side in FIG. 6A), a first cap fitting portion 44 is famed on one side of the case body 40 along its widthwise direction (upper side in FIG. 6A). The first cap fitting portion 44 is directed toward the drive unit 21 when the pulley apparatus 20 is fixed to the vehicle body panel 11a. This first cap fitting portion 44 facilitates routing of the outer tube 27 sheathing the cable 18 in the vehicle 10 (cable routing work). The direction of the first cap fitting portion 44 is set according to the mounting space for mounting the slide door opening and closing mechanism 16 on the vehicle body 11. This means that various case bodies 40 with first cap fitting portions 44 set in different directions are provided to be applied to various vehicles 10 with different mounting spaces.

On the interior of the first cap fitting portion 44, a first stepped portion 44a is formed to project inward from the interior of the first cap fitting portion 44. The cap 29 (see FIG. 2) is engaged with the first stepped portion 44a. When the case cover 50 is fitted to the case body 40, the engagement between the cap 29 and the first stepped portion 44a prevents the cap 29 from slipping out of the pulley case CA.

On the other side of the case body 40 along its lengthwise direction (left side in FIG. 6A), a guide fitting portion 45 is formed on the other side of the case body 40 along its widthwise direction (lower side in FIG. 6A). The guide fitting portion 45 has an almost arcuate section along the thickness direction of the case body 40 (see FIG. 5), and is located closer to the first pulley housing portion 42 of the case body 40.

On the other side of the case body 40 along its lengthwise direction, a cable lead-in slot 46 is so formed on a part close to the guide fitting portion 45 as to extend in the lengthwise direction of the case body 40. The cable lead-in slot 46 is formed as a cutout penetrating the case body 40 from its surface 40a to back surface 40b. The cable lead-in slot 46 plays a role of leading the cable 18 toward the guide fitting portion 45 when the pulley apparatus 20 is assembled (see FIGS. 4 and 8).

A guide fixing hole 47 is formed between the guide fitting portion 45 and the first pulley housing portion 42 of the case body 40. The guide fixing hole 47 is formed as a slit penetrating the case body 40 from its surface 40a to back surface 40b. A fixing leg 62 of the guide member 60 (see FIGS. 5 and 8) is inserted in the guide fixing hole 47 to be fixed there.

Three engagement claws 48 are formed on the peripheral edge (periphery) of the case body 40 such that each engagement claw 48 projects from the surface 40a of the case body 40 in the thickness direction of the case body 40 to have a given height. When the case cover 50 is fitted to the case body 40, the engagement nails 48 are engaged with engagement projections 58 of the case cover 50 (see FIGS. 7 and 8), respectively. In other words, the case body 40 and the case cover 50 are fitted together at one touch through engagement between the engagement claws 48 and the engagement projections 58. This allows dispensing with such components as fastening screws, thus leading to an improvement in assembling efficiency.

The guide member 60 serving as a cable guide is fitted on the guide fitting portion 45. As shown in FIG. 5, the guide member 60 is made into a slide-like shape by press working a steel plate. The guide member 60 has a guide body 61 made into an arcuate shape along a quarter fan (with a central angle of 90 degrees), and the fixing leg 62 inserted and fixed in the guide fixing hole 47 of the case body 40. The cable 18 comes in slide contact with the surface of the guide body 61, whose radius of curvature "R1" is set to be larger than the radius of curvature "R2" of the pulley groove 82 (see FIG. 4) formed on the pulley 80 (R1>R2).

In this manner, by bringing the cable 18 into slide contact with the surface of the guide body 61, the cable 18 led from the back surface 40b to the surface 40a of the case body 40 and guided in the pulley case CA, that is, the cable 18 led from the guide rail 15 side to the compartment side of the vehicle body panel 11a is curved along the vehicle body panel 11a and is directed toward the pulley groove 82 of the pulley 80. The guide member may be formed as an integral part of the case body 40, in which case the case body 40 should preferably be molded out of a resin material, etc., with high hardness in order to ensure the strength of the guide member.

The pulley 80 is disposed rotatably in the pulley case CA, and has flanges 81 and the pulley groove 82 into which the cable 18 moves (see FIG. 4). The radius of curvature "R2" of the pulley groove 82 is set to be the minimum radius of curvature with which the cable 18 is curved not so excessively as to suffer damage. Hence the pulley 80 is compactified to the minimum necessary size to realize miniaturization of the pulley apparatus 20. According to this embodiment, by determining the radius of curvature "R1" of the guide body 61 based on the radius of curvature "R2" of the pulley groove 82, damaging the cable 18 is prevented and an increase in the size of the pulley apparatus 20 to an undesired extent is also prevented. On both surfaces of the pulley 80, multiple thickness-reduced portions 83 are formed in the same manner as the thickness-reduced portions 41 of the case body 40.

As shown in FIG. 5, the guide body 61 projects toward the case cover 50 to have a given height in the pulley case CA. As a result, the cable 18 is guided by the guide body 61 to the central position of the pulley groove 82 along its axial direction, i.e., the normal position of the pulley 80. This prevents a case where the cable 18 comes in slide contact with the flanges 81 to increase the dynamic resistance of the pulley apparatus 20 or to partially wear the pulley 80.

In this manner, the guide member 60 is disposed between the cable lead-in slot 46 and the first pulley housing portion 42, and directs the cable 18 penetrating the vehicle body panel 11a between the guide-in portion 14b of the guide rail 15 and the pulley groove 82, from the guide-in portion 15b (Y-axis direction) toward the pulley groove 82 (x-axis direction) by curving the cable 18 at about 90 degrees. As shown in FIGS. 4 and 5, the pulley 80 changes the direction of the cable 18 curved by the guide member 60, by about 180 degrees to direct the cable 18 toward the drive unit 21. As shown in FIG. 5, the vehicle body panel 11a is of a double-structure having an inner panel on the compartment side (lower side in FIG. 5) and an outer panel on the guide rail 15 side.

As shown in FIG. 5, a load "F" from the cable 18, which load "F" includes the weight, slide resistance, etc., of the slide door 13, is applied to the guide member 60. Specifically, the load "F" from the cable 18 acts on the first pulley housing portion 42 of the case body 40 and is directed toward the vehicle body panel 11a. To put it another way, on the first pulley housing portion 42 of the case body 40, a pressing force f, which is a component of the load "F", is applied toward the vehicle body panel 11a. When the load "F" from the cable 18 is applied to the guide member 60, therefore, the first pulley housing portion 42 of the case body 40 is pressed with the pressing force f, against the vehicle body panel 11a.

The case cover 50 is assembled together with the case body 40 to form the pulley case CA, and is made into a bottomed box shape by injection molding a resin material, such as plastic. The case cover 50 closely covers up the case body 40 and is so disposed that the pulley apparatus 20 is fixed to the compartment side (one side) of the vehicle body panel 11a. As shown in FIGS. 7A and 7B, the case cover 50 has a body 51 and an outer peripheral wall 52. On both surfaces, i.e., surface 51a and back surface 51b of the body 51, multiple thickness-reduced portions (dented portions) 53 are formed in the same manner as the thickness-reduced portions of the case body 40.

On one side of the body 51 along its lengthwise direction (left side in FIG. 7B), a second pulley housing portion 54 is formed, in which the pulley 80 is housed when the case cover 50 is fitted to the case body 40. The second pulley housing portion 54 is almost disc-shaped, and is dented in the thickness direction of the body 51 in the same manner as the thickness-reduced portions 53. A fitting hole 55 is famed in the approximate center of the second pulley housing portion 54, and the end of the pulley shaft 70 so supporting the pulley 80 as to allow it rotate is fitted in the fitting hole 55. Both ends of the pulley shaft 70, therefore, are attached to the case body 40 and the case cover 50, respectively, to support the pulley shaft 70.

On the other side of the body 51 along its lengthwise direction (left side in FIG. 7A), a pair of fitting aims (fitting portions) 56 are formed to project toward both sides in the widthwise direction of the body 51 (upper/lower sides in FIGS. 7A and 7B). The fitting arms 56 have through-holes 56a, respectively, to which metal collars CL (see FIG. 4) are attached, respectively. Fastening bolts (not shown) for fixing the pulley apparatus 20 to the vehicle body panel 11a are put through the collars CL (through-holes 56a), respectively. Hence the pulley apparatus 20 is fixed to the compartment side of the vehicle body panel 11a via two fastening bolts. As a result, as shown in FIG. 5, a fixing part FP of each fitting arm 56 (central position of each through-hole 56a) is located opposite to the pulley 80 with respect to the guide member 60 along the lengthwise direction of the pulley case CA when the case cover 50 is fitted to the case body 40. Hence the guide member 60 (guide body 61) is located closer to the pulley 80 than each fitting arm 56 for fitting the pulley case CA along the vehicle body panel 11a to the vehicle body panel 11a.

On the other side of the case cover 50 along its lengthwise direction (right side in FIG. 7B), a second cap fitting portion 57 is famed on one side of the case cover 50 along its widthwise direction (upper side in FIG. 7B). The second cap fitting portion 57 is counter to the first cap fitting portion 44 of the case body 40 (see FIG. 6A), and when the pulley apparatus 20 is fixed to the vehicle body panel 11a, is directed toward the drive unit 21 in the same manner as the first cap fitting portion 44. On the interior of the second cap fitting portion 57, a second stepped portion 57a is formed to project inward from the interior of the second cap fitting portion 57. The cap 29 is engaged with the second stepped portion 57a in the same manner as engaged with the first stepped portion 44a of the case body 40.

Three engagement projections 58 are formed on the outer periphery (periphery) of the outer peripheral wall 52 forming part of the case cover 50. Each engagement projection 58 projects outward from the outer peripheral wall 52 to have a minute height. When the case cover 50 is fitted to the case body 40, the engagement claws 48 of the case body 40 are engaged with engagement projections 58, respectively. If the case cover 50 is not fitted properly to the case body 40, the engagement claws 48 and the engagement projection 58 are not engaged with each other. In other words, the engagement claws 48 and the engagement projection 58 have a function of preventing improper attachment of the case cover 50 to the case body 40.

As shown in FIG. 5, the seal cover 90 is made into a given shape by injection molding an elastic material, such as rubber, and has an attachment body portion 91, a panel adhesion portion 92, and a bellows portion 93. The attachment body portion 91 is attached to the part of case body 40 on which the cable lead-in slot 46 is formed, and the panel adhesion portion 92 is adhered to the vehicle body panel 11a (outer panel) to cover the opening 11b. The cable 18 comes in slide contact with the bellows portion 93, which swings freely by elastically defaming relative to the attachment body portion 91 and the panel adhesion portion 92. The seal cover 90 provided in this manner prevents incoming rainwater, dust, etc., from the outside of the pulley apparatus 20 opposite to the compartment, i.e., the guide rail 15 side, from passing through the opening 11b of the vehicle body panel 11a to enter the pulley apparatus 20. As a result, grease (not shown) applied between the pulley shaft 70 and the pulley 80 is preserved for a long period to allow the pulley 80 to operate smoothly.

Figure 8:
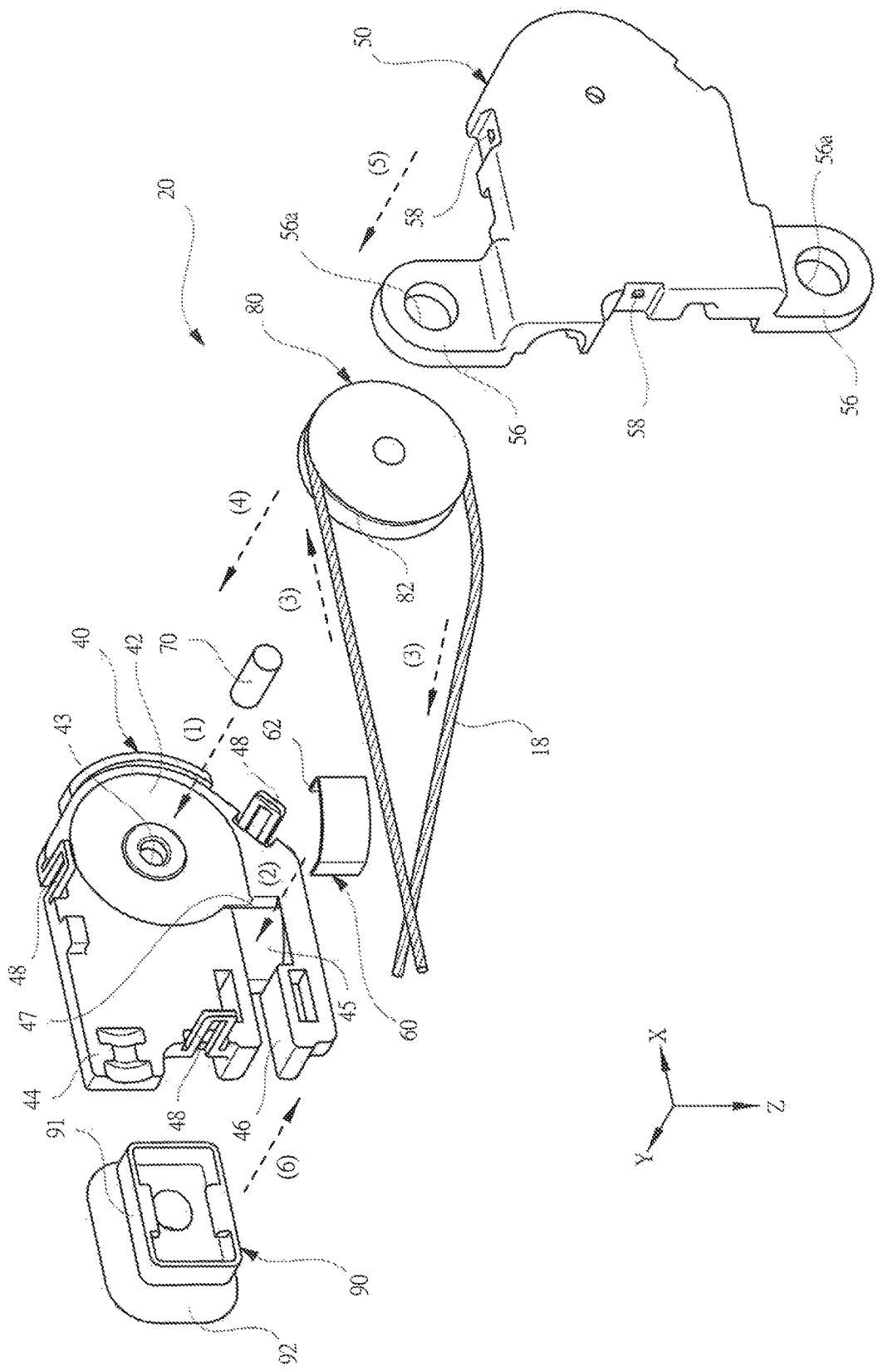
FIG. 8 is an exploded perspective view showing and explaining an assembling sequence of the pulley apparatus.

An assembling procedure for the pulley apparatus 20 constructed in the above manner will then be described in detail, referring to drawings. FIG. 8 is an exploded perspective view for explaining the assembling procedure for the pulley apparatus. To make FIG. 8 more understandable, the thickness-reduced portions 41, 53, and famed on the case body 40, case cover 50, and pulley 80, respectively (see FIGS. 4, 6, and 7), are omitted from FIG. 8.

As indicated by a broken line arrow (1) in FIG. 8, one end of the pulley shaft 70 is fitted in the fitting hole 43 of the case body 40. Subsequently, as indicated by a broken line arrow (2), the fixing leg 62 of the guide member 60 is inserted in the fixing hole 47 of the case body 40 to fix the guide member 60 to the guide fitting portion 45.

Subsequently, as indicated by a broken line arrow (3), the cable 18 is put around the pulley groove 82 of the pulley 80, and then the pulley 80 is fitted on the pulley shaft 70 so that the pulley 80 is supported rotatably on the pulley shaft 70, as indicated by a broken line arrow (4). At this time, grease is applied to a sliding part between the pulley shaft 70 and the pulley 80. The cap 29 (see FIG. 2) holding the cable 18 inserted therein is fitted to the first cap fitting portion 44, and the cable 18 is put in the cable lead-in slot 46 to cause the cable 18 to face the guide member 60.

Subsequently, the case cover 50 is prepared, and the second pulley housing portion 54 of the case cover 50 (see FIG. 7B) and the first pulley housing portion 42 of the case body 40 are set counter to each other. The case cover 50 is then faced toward the case body 40, and the other end of the pulley shaft 70 is fixed to the fitting hole 55 of the case cover 50 (see FIG. 7B). At this time, the case cover 50 is fitted properly to the case body 40 so as to avoid improper assembling. As a result, the engagement claws 48 of the case cover 40 are engaged with the engagement projections 58 of the case cover 50, respectively. Hence the case cover 50 is fitted perfectly to the case body 40 to complete the pulley case CA.

It is clearly understood by observing the broken line arrows (1), (2), (4), and (5) that the pulley shaft 70, the guide member 60, the pulley 80, and the case cover 50 are attached in the same direction to the case body 40 to complete the pulley case CA. The pulley case CA, therefore, can be assembled easily, using, for example, an automatic assembler.

Subsequently, as the cable 18 is already inserted in the bellows portion 93 of the seal cover 90 (see FIG. 5), the attachment body portion 91 of the seal cover 90 is attached to the case body 40 to complete the pulley apparatus 20. The slide door opening and closing mechanism 16 (see FIG. 2) including the pulley apparatus 20 is mounted on a given part of the vehicle 10 by a vehicle manufacturer.

As described above, the pulley apparatus 20 of the first embodiment includes the pulley case CA disposed on the compartment side of the vehicle body panel 11a forming part of the vehicle 10, the pulley 80 disposed rotatable in the pulley case CA, and the guide member 60 disposed in the pulley case CA, the guide member 60 guiding the cable 18 led from the guide rail 15 side to the compartment side of the vehicle body panel 11a and coming in slide contact with the guide member 60 and curving the cable 18 along vehicle body panel 11a to direct the cable 18 to the pulley 80. The pulley apparatus 20 having this configuration can direct the load "F" applied to the cable 18 toward the vehicle body panel 11a via the guide member 60. As a result, when the slide door opening and closing mechanism 16 is driven, that is, when the load "F" is applied to the cable 18, the pulley case 40 is pressed against the vehicle body panel 11a, which suppresses rattling noise and vibration of the pulley case CA. Since the load F applied to the cable 18 presses the case body 40 against the vehicle body panel 11a, providing an additional fitting arm 56 for fixing the pulley case CA to the vehicle body panel 11a is unnecessary. This prevents an increase in the size of the pulley case CA and reduction of workability in fitting the pulley case CA to the vehicle body 11.

According to the pulley apparatus 20 of the first embodiment, the guide member 60 is located closer to the pulley 80 than the fitting arms 56 for fitting the case body 40 along the vehicle body panel 11a to the vehicle body panel 11a. It is therefore unnecessary to form the fitting arms 56 on the case cover 50 such that the fitting arms 56 are located closer to the pulley 80. In other words, the fitting arms 56 can be formed collectively on the other side of the case cover 50 along its lengthwise direction (left side in FIG. 7A). This improves workability in fitting the pulley apparatus 20 to the vehicle body panel 11a.

According to the pulley apparatus 20 of the first embodiment, the pulley 80 is disposed in the pulley case CA such that the axial direction of the pulley 80 matches the thickness direction of the vehicle body panel 11a. As a result, the pulley apparatus 20 can be disposed compactly along the vehicle body panel 11a without widely projecting from the vehicle body panel 11a.

Second Embodiment

Next, the second embodiment of the present invention will be described in detail. Additionally, elements the same in function as those of the above-mentioned first embodiment are denoted by the same reference numbers, and the detail descriptions thereof are omitted here.

Figure 9:
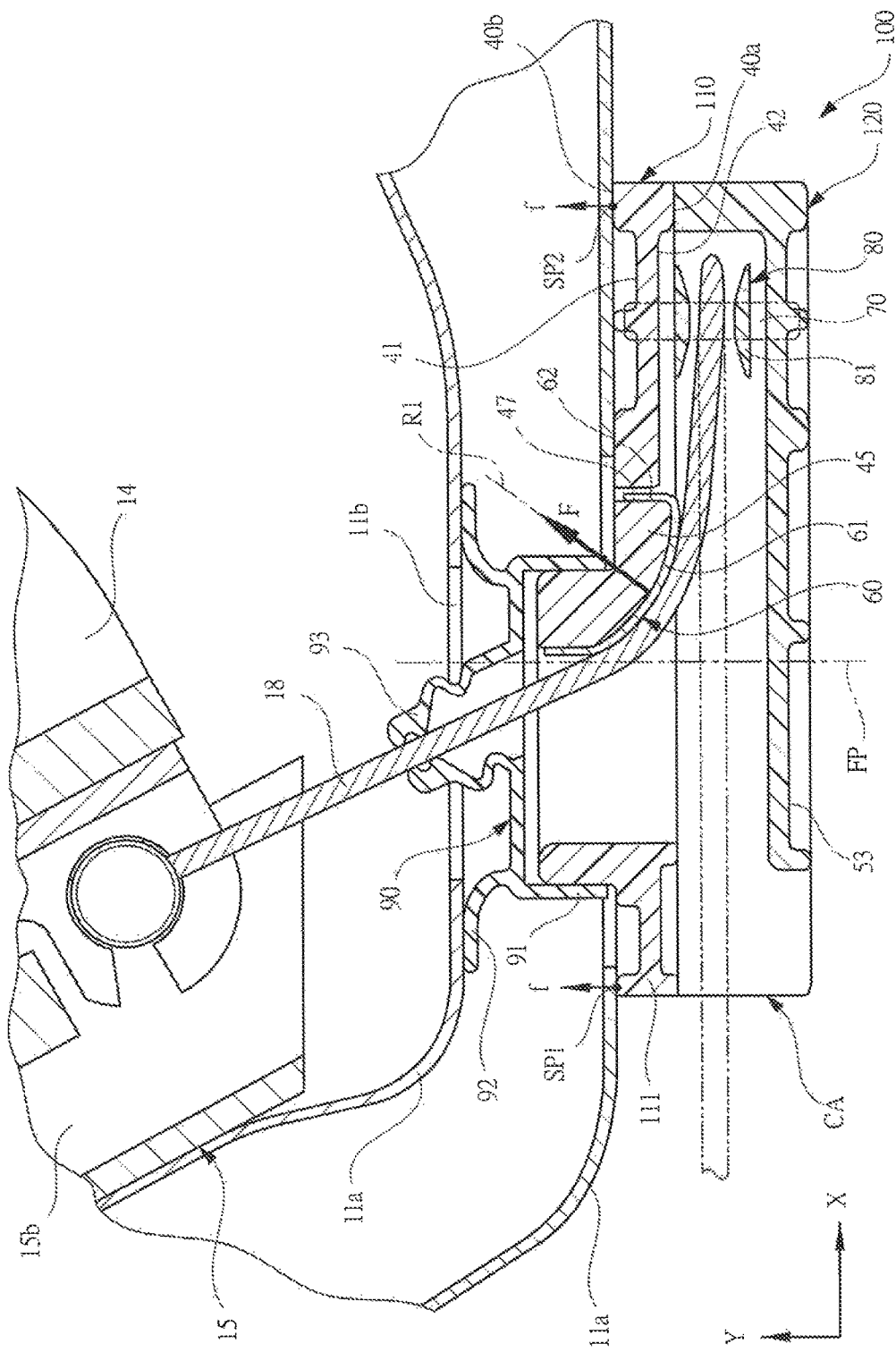
FIG. 9 is a sectional view corresponding to that of FIG. 5, and showing the pulley apparatus according to the second embodiment.
Figure 10:
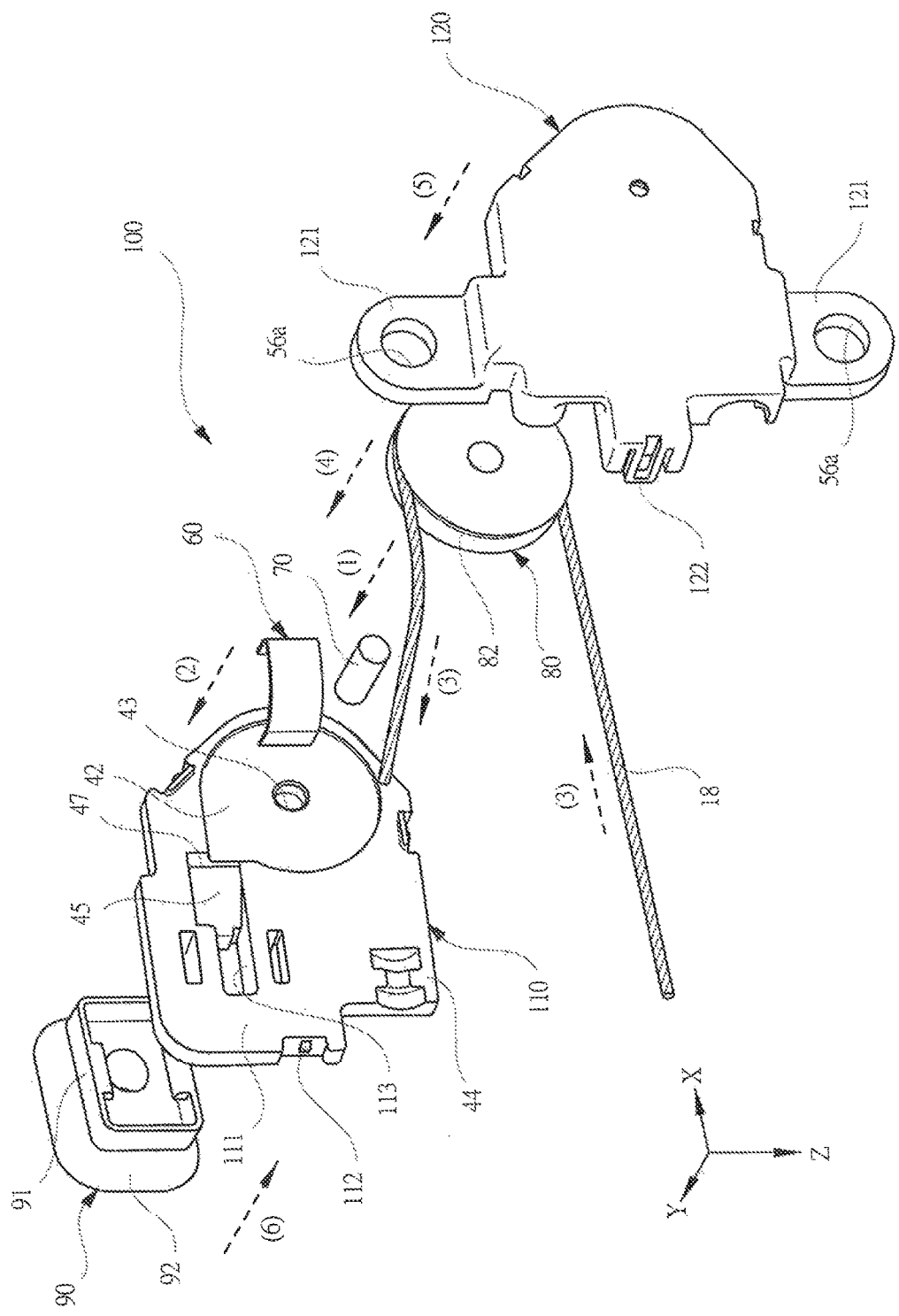
FIG. 10 is an exploded perspective view corresponding to that of FIG. 8, and showing the pulley apparatus according to the second embodiment.

FIG. 9 is a sectional view corresponding to that of FIG. 5, and showing the pulley apparatus according to the second embodiment, and FIG. 10 is an exploded perspective view corresponding to that of FIG. 8, and showing the pulley apparatus according to the second embodiment.

As shown in FIGS. 9 and 10, a pulley apparatus 100 of the second embodiment is different from the pulley apparatus of the first embodiment firstly in that a case body (pulley case) 110 is different in shape from the case body of the first embodiment. Specifically, on the case body 110, the opening of the cable lead-in slot 46 (left side in FIGS. 5 and 10) is blocked with a bridging portion 111, which is set in contact with the vehicle body panel 11a. The bridging portion 111, specifically, is formed to be counter to the guide fitting portion 45. As a result, a cable lead-in hole 113 is formed on the case body 110 and the area of case body 110 which surrounds the entire periphery of the cable lead-in hole 113 is set in contact with the vehicle body panel 11a. Hence both ends (two spots) of the case body 110 in its front-to-rear direction (x-axis direction) are pressed with the pressing force f, against the vehicle body panel 11a.

The pulley apparatus 100 of the second embodiment is different from the pulley apparatus of the first embodiment secondly in that a case cover (pulley case) 120 is different in shape from the case cover of the first embodiment. Specifically, fitting arms (fitting portion) 121 are formed in an offset location on the case cover 120 which is closer to the pulley 80 so that the fixing parts EP of the pulley apparatus 100 are located closer to the guide member 60 (guide fitting portion 45) than the fixing parts EP of the first embodiment. As a result, the fixing parts EP are located closer to the center of a segment connecting contact parts SP1 and SP2 (black circles) shown in FIG. 9. Hence the pulley apparatus 100 is fitted to the vehicle body panel 11a via "four points (two points corresponding to the fixing parts FP of the fitting arms 121 and two points corresponding to the contact parts SP1 and SP2)".

The pulley apparatus 100 of the second embodiment is different from the pulley apparatus of the first embodiment thirdly in the location of the engagement claws and projections. According to the pulley apparatus 100 of the second embodiment, multiple engagement projections 112 (only one of them is shown in FIG. 10) are formed on the periphery of the case body 110 while multiple engagement claws 122 (only one of them is shown in FIG. 10) are formed on the periphery of the case cover 120. This means that the positional relation between the engagement projections and the engagement claws of the second embodiment is reverse to that of the first embodiment (see FIGS. 8 and 10). These engagement projections and engagement claws also prevent improper attachment of the case cover 120 to the case body 110.

As described above, the pulley apparatus 100 of the second embodiment offers the same effect as offered by the pulley apparatus of the first embodiment. In addition, according to the second embodiment, the pulley apparatus 100 is fixed to the vehicle body panel 11a at "four points". This allows the pulley apparatus 100 to be fixed to the vehicle body panel 11a in a more balanced manner, and prevents the pulley apparatus from making rattling noise and being vibrated.

The present invention is not limited to the above embodiments but may obviously be modified into various forms on the condition that the modification does not deviate from the substance of the invention. For example, in the above embodiment, the present invention applies to the pulley apparatuses 20 and 100 of the slide door opening and closing mechanism 16 which opens and closes the left slide door 13 of the vehicle 10. The present invention, however, may apply also to (front-side/rear-side) pulley apparatuses of a slide door opening and closing mechanism which opens and closes a right slide door (not shown) of the vehicle 10.

Third Embodiment

Next, the third embodiment of the present invention will be described in detail.

Conventionally, the slide door opening and closing mechanism is known and disclosed in, for example, Japanese Patent Application Laid-Open Publication No. 2005-213831 (FIGS. 4 and 7). In the slide door opening and closing mechanism disclosed in Japanese Patent Application Laid-Open Publication No. 2005-213831, the pulley apparatus is disposed on the front side of the guide rail of the vehicle, and the pulley shaft is disposed in the substantially-longitudinal direction of the vehicle.

Since the slide door opening and closing mechanism guides the slide door into the opening section, as described above, the guide rail forming part of the slide door opening and closing mechanism needs the above guide-in portion. To secure a sufficiently wide compartment space when applying such a slide door opening and closing mechanism to a small-sized vehicle, such as light vehicle, therefore, it is essential to miniaturize the slide door opening and closing mechanism. Specifically, by miniaturizing the peripheral part surrounding the guide-in portion of the guide rail of the slide door opening and closing mechanism, a sufficiently wide compartment space is secured, and consequently the slide door opening and closing mechanism can be easily applied to a small-sized vehicle, such as light vehicle.

According to the pulley apparatus described in Japanese Patent Application Laid-Open Publication No. 2005-213831, however, the pulley apparatus is incorporated in the vehicle such that the radial direction of the pulley substantially matches the width direction of the vehicle. The diameter of the pulley is set to be relatively large (e.g., 5 cm) so that no damage is given to the cable. As a result, according to the pulley apparatus described in Japanese Patent Application Laid-Open Publication No. 2005-213831, the size in the vehicle width direction (width dimension) of the peripheral part surrounding the guide-in portion of the slide door opening and closing mechanism becomes relatively large. This brings a requirement that the width dimension of the peripheral part surrounding the guide-in portion of the slide door opening and closing mechanism be reduced when the slide door opening and closing mechanism is applied to a small-sized vehicle, such as light vehicle.

An object of the third embodiment is to provide a pulley apparatus which reduces the width dimension of the peripheral part surrounding the guide-in portion of the slide door opening and closing mechanism so that the slide door opening and closing mechanism can easily be applied to a small-sized vehicle, such as light vehicle.

Hereinafter, one embodiment of the present invention will be described in detail with reference to the attached drawings.

Figure 11:
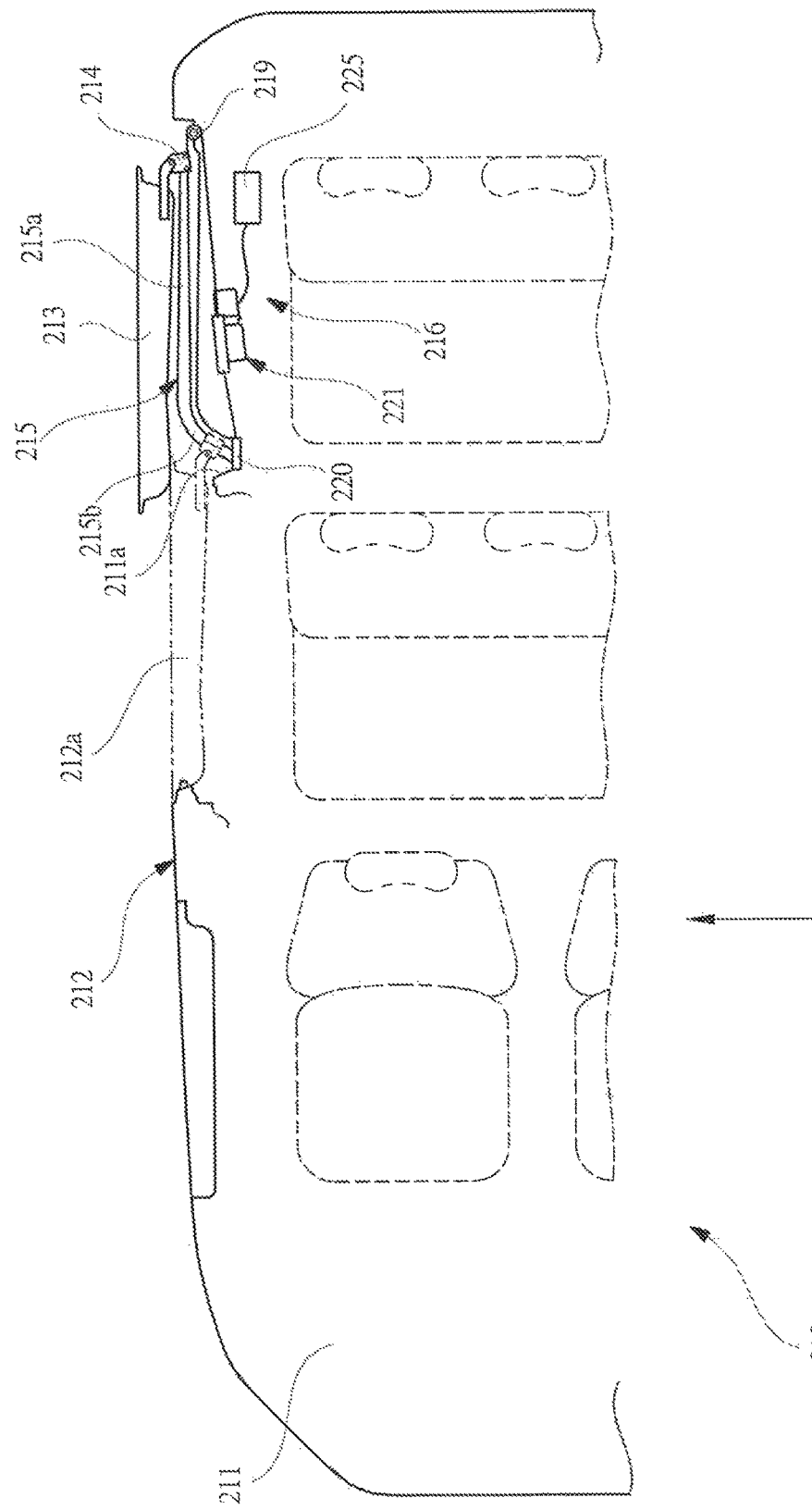
FIG. 11 is a view schematically showing a vehicle mounted with a slide door opening and closing mechanism having a pulley apparatus.
Figure 12:
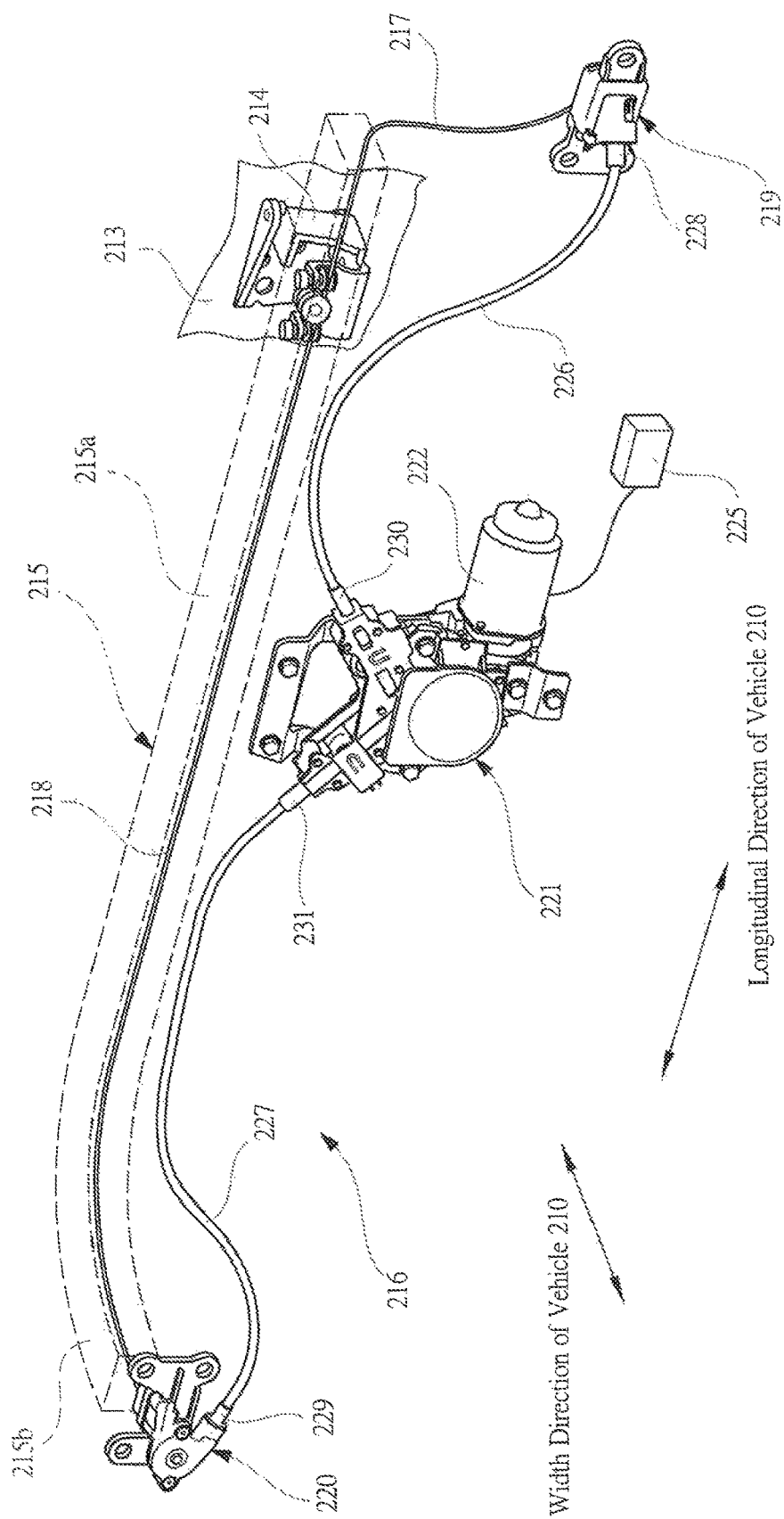
FIG. 12 is a perspective view showing the slide door opening and closing mechanism of FIG. 11.
Figure 13:
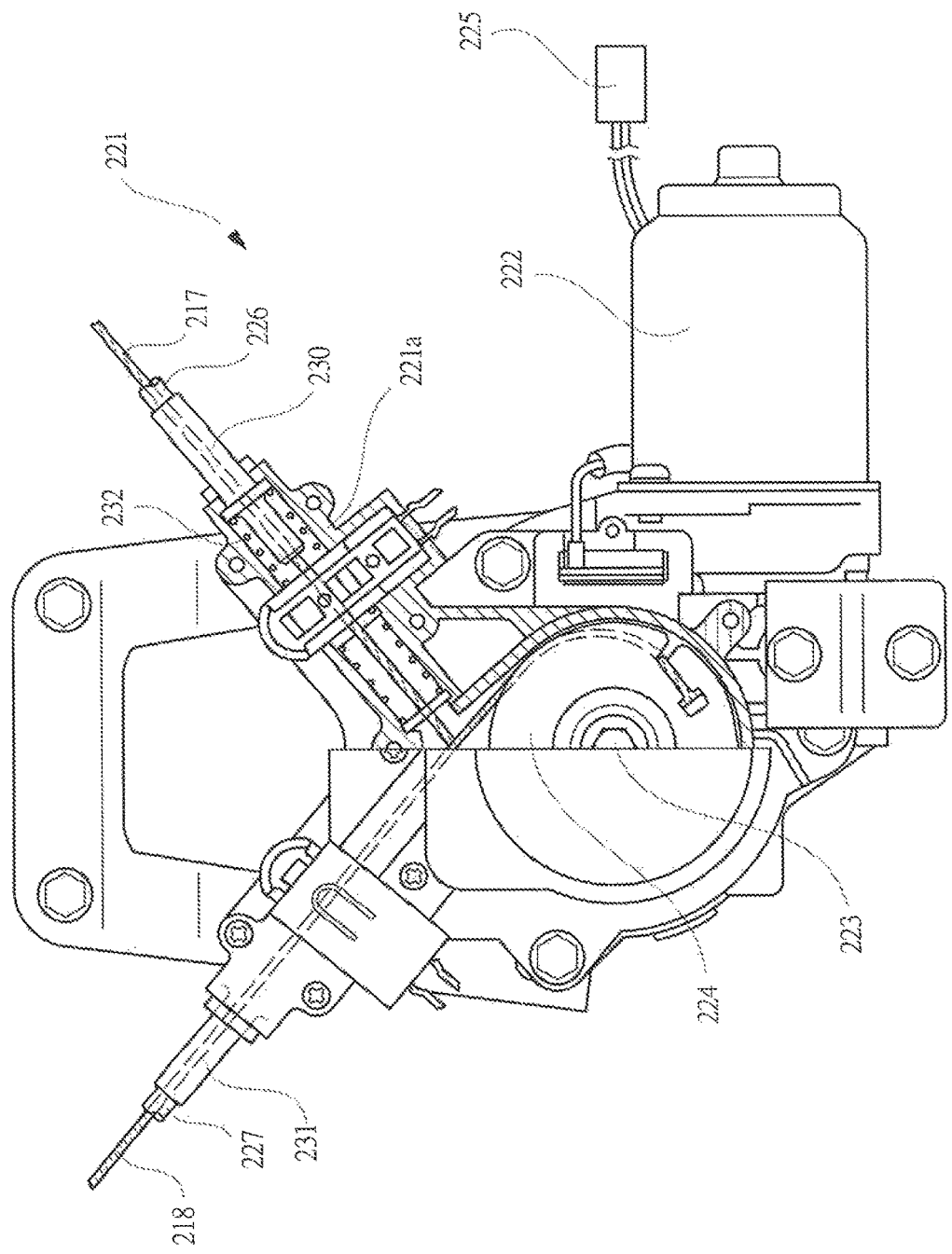
FIG. 13 is a fragmentary sectional view showing a drive unit of the slide door opening and closing mechanism of FIG. 12.

FIG. 11 is a view schematically showing a vehicle mounted with a slide door opening and closing mechanism having a pulley apparatus, FIG. 12 is a perspective view showing the slide door opening and closing mechanism of FIG. 11, and FIG. 13 is a fragmentary sectional view showing a drive unit of the slide door opening and closing mechanism of FIG. 12.

As shown in FIG. 11, a vehicle 210 is a car known as minivan. On one side 212 of a vehicle body 211 forming part of the vehicle 210, a slide door 213 is disposed, which opens and closes an opening section 212a formed on the side 212. The slide door 213 has a roller assembly 214, which is guided by a guide rail 215 so disposed on the vehicle body 211 as to extend in the front-to-rear direction of the vehicle 210. In other words, the slide door 213 is guided by the guide rail 215 to move in the front-to-rear direction of the vehicle 210.

The guide rail 215 has a linear portion 215a extending in the front-to-rear direction of the vehicle 210 and a guide-in portion 215b extending in the width direction of the vehicle 210, i.e., the direction crossing the front-to-rear direction of the vehicle 210 (vertical direction in FIG. 11). The guide-in portion 215b is located closer to the front of the vehicle 210, that is, closer to the opening section 212a than the linear portion 215a, and is curved from the side 212 toward the interior (compartment) of the vehicle 210 to form a guide-in track. The guide-in portion 215b is of an almost arcuate shape. As a result, when the slide door 213 is about to be fully closed, the roller assembly 214 rolls along the guide-in portion 215b, which causes the slide door to slide into the opening section 212a, thus putting the slide door in a fully closed state (see a two-dot chain line in FIG. 11).

The vehicle body 211 is equipped with a slide door opening and closing mechanism 216 which opens and closes the slide door 213. As shown in FIG. 12, the slide door opening and closing mechanism 216 has a pair of cables 217 and 218 whose respective one ends are connected to the roller assembly, a pair of pulley apparatuses 219 and 220 which change the direction of the cables 217 and 218, i.e., direction of movement of the cables 217 and 218 on the rear side of guide rail 215 which is closer to the rear of the vehicle 210 and the front side of guide rail 215 which is closer to the front of the vehicle 210, respectively, and a drive unit 221 which pulls the cables 217 and 218. The drive unit 221 is situated in the approximate center along the lengthwise direction of the guide rail 215, and is fixed to the compartment side of a vehicle body panel 211a (see FIGS. 11 and 15) forming part of the vehicle body 211.

As shown in FIG. 13, the drive unit 221 has an electric motor 222 serving as a driving source. Output from the electric motor 222 is transmitted to an output shaft 223 via a speed-reducing mechanism (not shown). To the output shaft 23, an almost cylindrical drum 224 is fixed, which is rotated when the rotation of the electric motor 222 is transmitted to the drum 224 via the speed-reducing mechanism and the output shaft 223. To the drum 224, the other ends of the cables 217 and 218 are fixed. A helical groove for cable winding (not shown) is formed on the outer periphery of the drum 224, and the cables 217 and 218 guided to the drive unit 221 are so wound along the helical groove that the cables 217 and 218 are turned several times in directions reverse to each other.

When the drum 224 is rotated clockwise in FIG. 13, the opening-side cable 217 is reeled onto the drum 224 as the closing-side cable 218 is sent out from the drum 224. The slide door 213 is thus pulled by the opening-side cable 217 to automatically make an opening movement. In contrast, when the drum 224 is rotated counterclockwise in FIG. 13, the closing-side cable 218 is reeled onto the drum 224 as the opening-side cable 217 is sent out from the drum 224. The slide door 213 is thus pulled by the closing-side cable 218 to automatically make a closing movement.

For example, a motor capable of rotating clockwise and counterclockwise, such as a DC motor with a brush, is used as the electric motor 222. The rotation of the electric motor 222 is controlled by a control unit 225 having a CPU, memory, etc.

As shown in FIG. 12, the rear-side pulley apparatus 219 is disposed on the rear side of the linear portion 215a of the guide rail 215 which is closer to the rear of the vehicle 210. The rear-side pulley apparatus 219 is fixed to the vehicle body panel 211a with a fastening bolt, etc. (not shown). The pulley apparatus 219 changes the direction of the opening-side cable 217 by about 180 degrees, and guides the other end of the cable 217 turned back on the rear side of the vehicle 210 to the drive unit 221 while guides the one end of the cable 217 to the roller assembly 214.

On the side of the guide-in portion 215b of the guide rail 215 which is closer to the compartment of the vehicle 210, the front-side pulley apparatus 220 is disposed to be counter to the guide-in portion 215b in the width direction of the vehicle 210. The pulley apparatus 220 is fixed to the vehicle body panel 211a with a fastening bolt, etc. (not shown). The pulley apparatus 220 changes the direction the closing-side cable 218 by about 90 degrees, and guides the other end of the cable 218 turned back on the front side of the vehicle 210 to the drive unit 221 while guides one end of the cable 218 to the roller assembly 214.

The angles of change of the directions of the cables 217 and 218 by the pulley apparatuses 219 and 220 are set according to a mounting space for mounting the slide door opening and closing mechanism 216 on the vehicle body 211. Each of the cable 217 and 218 has its surface coated with a rust preventive resin material (not shown).

Between the drive unit 221 and the pulley apparatus 219 and between the drive unit 221 and the pulley apparatus 220, a pair of outer tubes 226 and 227 are provided, which so sheathe the cables 217 and 218 that they are slidable in the outer tubes, respectively. Each of the outer tubes 226 and 227 is made up of a metal layer and a resin layer and is flexible. To one ends of the outer tubes 226 and 227, resin caps 228 and 229 are attached, which guide the cables 217 and 218 from the pulley apparatuses 219 and 220 which enter and exit the outer tubes 226 and 227, respectively. The one ends of the outer tubes 226 and 227 are fixed to the pulley apparatuses 219 and 220 via the caps 228 and 229, respectively.

To the other ends of the outer tubes 226 and 227, as shown in FIG. 13, resin slide caps 230 and 231 are fixed, respectively, such that the slide caps 230 and 231 proceed and retreat freely to and from the unit case 221a of the drive unit 221. The slide caps 230 and 231 are kept pushed in the direction of pushing them out of the unit case 221a, by springs 232 placed in the unit case 221a, respectively. As a result, the outer tubes 226 and 227 are pushed out of the unit case 221a and are curved between the drive unit 221 and the pulley apparatus 219 and between the drive unit 221 and the pulley apparatus 220, respectively.

Curving the outer tubes 226 and 227 extends respective travel routes of the cables 217 and 218 between the drive unit 221 and the pulley apparatus 219 and between the drive unit 221 and the pulley apparatus 220 and provides the cables 217 and 218 with a given tension. In other words, by curving the outer tubes 226 and 227 by the push of the springs 232, the cables 217 and 218 are rid of their slacks.

The structure of the front-side pulley apparatus 220 to which the present invention applies will then be described in detail, referring to drawings. In this embodiment, as shown in FIG. 12, the front-side pulley apparatus 220 and the rear-side pulley apparatus 219 are different in structure from each other. However, the rear-side pulley apparatus 219 and the front-side pulley apparatus 220 may have the same configuration and the present invention applies also to such pulley apparatuses 219 and 220.

Figure 16A:
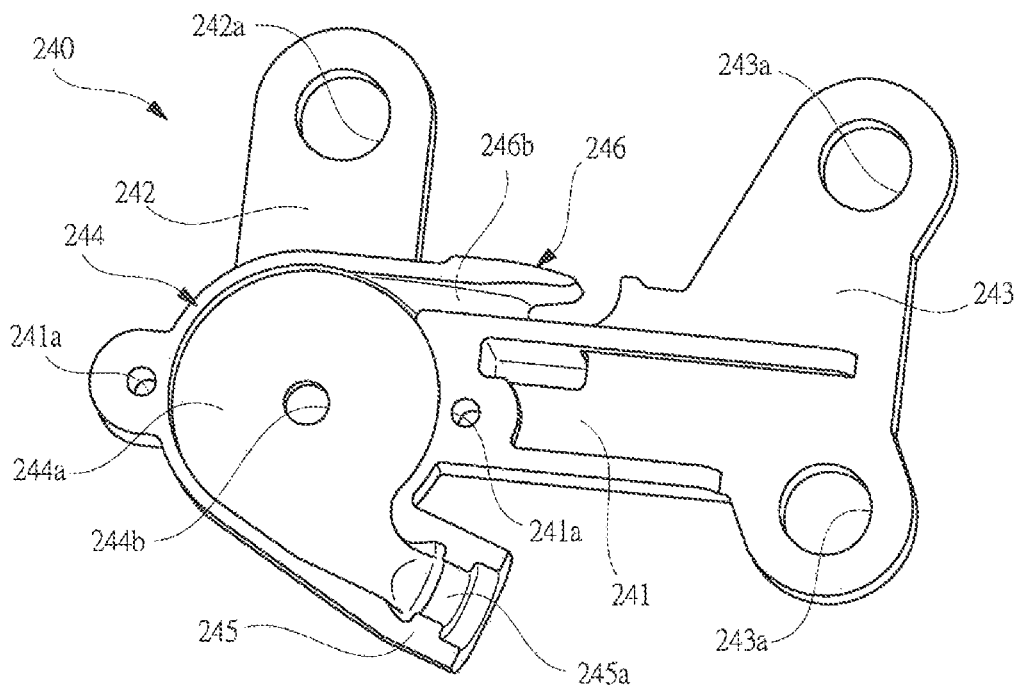
FIGS. 16A and 16B are perspective views showing a front side and a rear side of a case body forming part of the pulley apparatus.
Figure 16B:
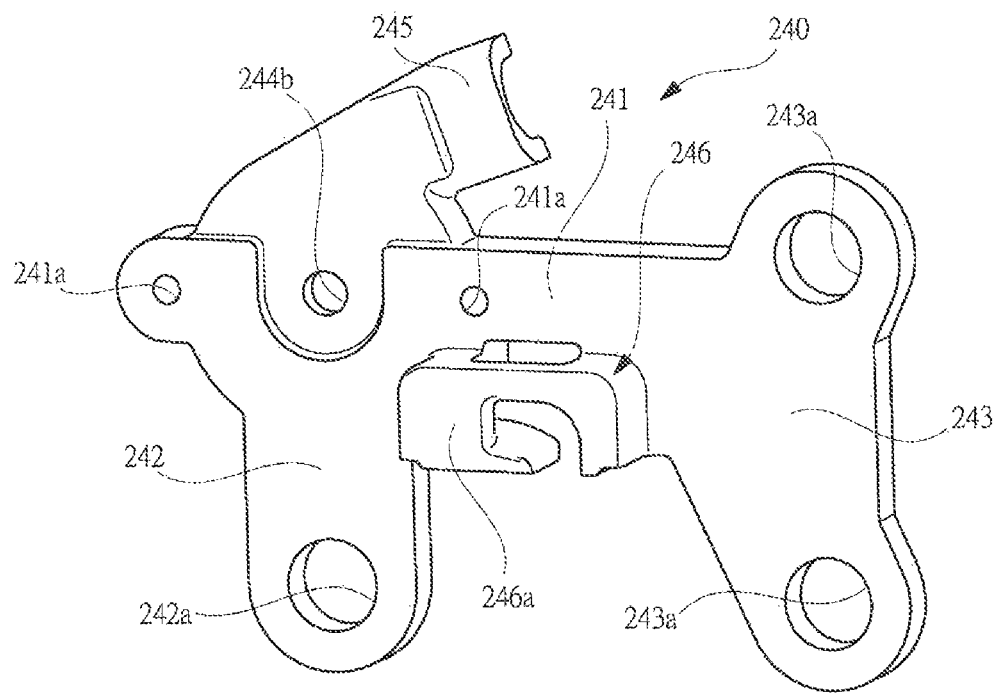
Figure 17A:
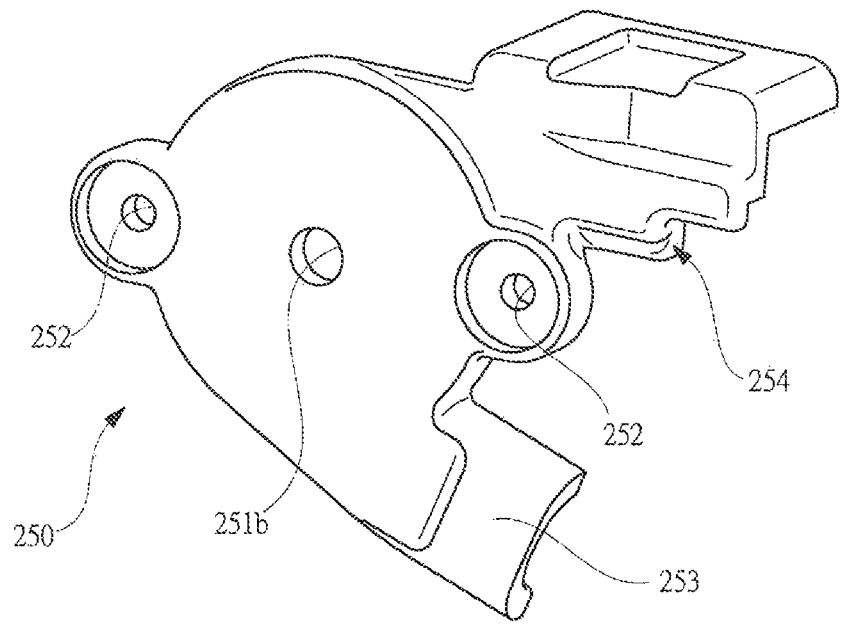
FIGS. 17A and 17B are perspective views showing a front side and a rear side of a case cover forming part of the pulley apparatus.
Figure 17B:
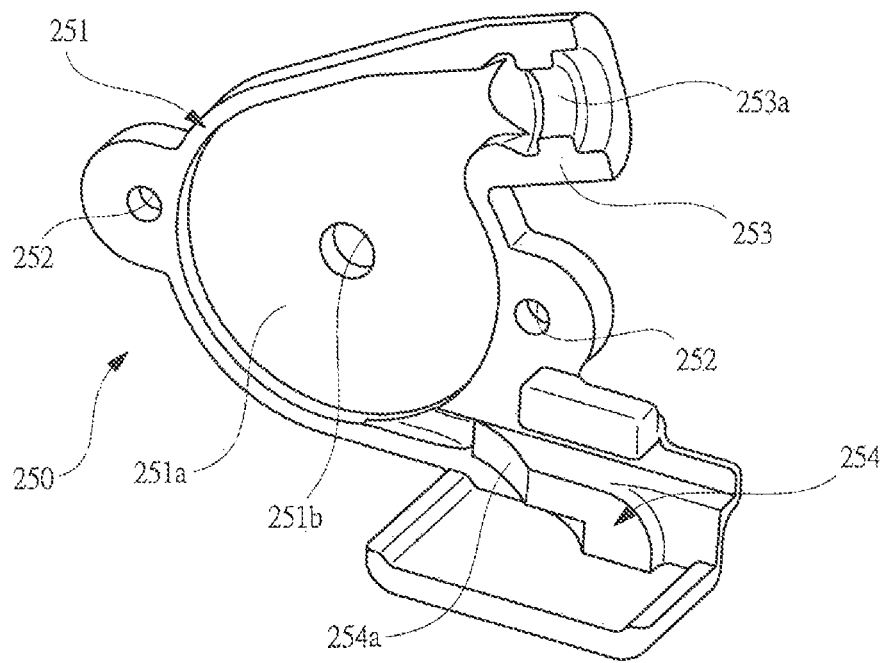

FIG. 14 is an enlarged perspective view of the pulley apparatus closer to the vehicle front side, FIG. 15 is a sectional view of the pulley apparatus of FIG. 14 along the front-to-rear direction and width direction of the vehicle for explaining the internal structure of the pulley apparatus, FIGS. 16A and 16B are perspective views showing the front side and back side of the case body forming part of the pulley apparatus, respectively, and FIGS. 17A and 17B are perspective views showing the front side and back side of the case cover forming part of the pulley apparatus, respectively.

As shown in FIGS. 14 and 15, the pulley apparatus 220 changes the direction of the cable 218 by about 90 degrees. Specifically, the pulley apparatus 220 changes the direction of movement of the cable 218 from the direction of movement along the guide-in portion 215b of the guide rail 215 (Y-axis direction) to the direction of movement toward the drive unit 21 (X-axis direction). The pulley apparatus 220 has a resin case body 240, a resin case cover 250, a metal pulley shaft 260, a resin pulley 270, and a rubber seal cover 280.

The case body 240 is assembled together with the case cover 250 to form the pulley case CA, and is made into a given shape by injection molding a resin material, such as plastic. The case body 240 is fixed to the vehicle body panel 211a, and has a tabular body portion 241, as shown in FIGS. 6A and 6B. On both ends of the body portion 241 in its lengthwise direction, fitting arms 242 and 243 are formed integrally for fixing the pulley apparatus 220 to the vehicle body panel 211a. One fitting arm 242 has one through-hole 242a through which a fastening bolt FB (see FIG. 15) is put, while the other fitting arm 243 has two through-holes 243a through which fastening bolts FB are put, respectively. The pulley apparatus 220 is, therefore, fixed firmly to the vehicle body panel 211a via three fastening bolts FB. The body portion 241 has a pair of screw holes 241a formed to be counter to each other across a first pulley housing portion 244. Fixing screws FS (see FIGS. 14 and 18) for fixing the case cover 250 to the case body 240 are screwed in the screw holes 241a, respectively.

On the one fitting arm 242 formed on one end of the body portion 241 along its lengthwise direction, the first pulley housing portion 244 is formed integrally as an almost cylindrical shape which is reduced in thickness in the thickness direction of the body portion 241. The first pulley housing portion 244 has a bottom 244a with a through-hole 244b formed in its approximate center such that the through-hole 244b penetrates the body portion 241 in its thickness direction. The pulley shaft 260 is press fitted in the through-hole 244b and is fixed there. By fixing the pulley shaft 260 to the through-hole 244b in this manner, when the pulley apparatus 220 is fixed to the vehicle body panel 211a, the pulley shaft 260 is extended in the width direction of the vehicle 210 (y-axis direction) as the radial direction of the pulley 270 supported rotatably on the pulley shaft 260 is matched to the front-to-rear direction of the vehicle 210 (x-axis direction), as shown in FIGS. 14 and 15. The z-axis direction in FIGS. 14 and 15 corresponds to the vertical direction of the vehicle 210.

The first pulley housing portion 244 also has a first cap fitting portion 245 in which a cap 229 (see FIG. 14) is fitted, and a first lead-in/guide-in portion 246 which provides a guide track along which the cable 218 from the guide-in portion 215b is lead into the first pulley housing portion 244, the first cap fitting portion 245 and the first lead-in/guide-in portion 246 being formed integrally on the first pulley housing portion 244.

The first cap fitting portion 245 is formed to be tilted at a given angle against the first pulley housing portion 244 so that the first cap fitting portion 245 is directed toward the other fitting arm 243, i.e., toward the drive unit 221 when the pulley apparatus 220 is fixed to the vehicle body panel 211a. This facilitates routing of the outer tube 227 sheathing the cable 218 (cable routing work) in the vehicle 210. The angle of tilt of the first cap fitting portion 245 against the first pulley housing portion 244 is determined according to a mounting space for mounting the slide door opening and closing mechanism 216 on the vehicle body 211. If case bodies different in angle of tilt of the first cap fitting portion 245 against the first pulley housing portion 244 are prepared, therefore, such case bodies can be applied to various vehicle bodies with different mounting spaces.

On the interior of the first cap fitting portion 44, a first stepped portion 245a is formed to project inward from the interior of the first cap fitting portion 245. The cap 229 is engaged with the first stepped portion 245a, and when the case cover 250 is fitted to the case body 240, the engagement between the cap 29 and the first stepped portion 44a prevents the cap 229 from slipping out of the pulley case CA.

The first lead-in/guide-in portion 246 is formed into an almost rectangular parallelepiped, as shown in FIG. 16B, and is projected on the side of body portion 241 which is opposite in its thickness direction to the side on which the first pulley housing portion 244 is formed. On the side of first lead-in/guide-in portion 246 which is closer to the vehicle body panel 211a, a panel counter face 246a is formed. Inside the first lead-in/guide-in portion 246, an arcuate projection (cable guide) 246b projecting inward in the first lead-in/guide-in portion 246 is formed.

As shown in FIG. 15, the arcuate projection 246b is disposed between the panel counter face 246a and the first pulley housing portion 244, and the cable 218 comes in slide contact with the surface of the arcuate projection 246b. The arcuate projection 246b is made into an arcuate shape with a surface along a quarter fan (with a central angle of 90 degrees), which is a slide-like shape. The radius of curvature "R1" of this arcuate shape is determined to be equal to the radius of curvature "R2" of a pulley groove 272 (see FIG. 14) formed on the pulley 270 (R1=R2). By bringing the cable 218 into sliding contact with the surface of the arcuate projection 246b in this manner, the cable 218 guided into the pulley case CA is curved toward the pulley groove 272.

The pulley 270 has flanges 271 and the pulley groove 272 into which the cable 218 moves. The radius of curvature "R2" of the pulley groove 272 is set to be the minimum radius of curvature with which the cable 218 is curved not so excessively as to suffer damage. The pulley 270 is compactified to the minimum necessary size to realize miniaturization of the pulley apparatus 220. According to this embodiment, by determining the radius of curvature "R1" of the arcuate projection 246b based on the radius of curvature "R2" of the pulley groove 272, damaging the cable 218 is prevented and an increase in the size of the pulley apparatus 20 to an undesired extent is also prevented.

The height of the arcuate projection 246b from the bottom 244a along the axial direction of the pulley shaft 260 is set to be a height H. As a result, the position of top T (denoted by a black point in FIG. 15) of the arcuate projection 246b along the axial direction of the pulley shaft 260 is set to be the position at which the arcuate projection 246b guides the cable 218 to the central position C of the pulley groove 272 of the pulley 270 along the axial direction of the pulley shaft 260. In this manner, the height H of the arcuate projection 246b (position of the top T) is set in correspondence to the central position C of the pulley groove 272. This allows the cable 218 to come in sliding contact with the surface of the arcuate projection 246b to be surely guided to the normal position, i.e., central position C of the pulley groove 272. As a result, the cable 218 is prevented from coming in sliding contact with the flanges 271 of the pulley 270, that is, part of the pulley 270 other than the pulley groove 272.

In this manner, the arcuate projection 246b is disposed between the panel counter face 246a and the first pulley housing portion 244, and curves the cable 218 between the guide-in portion 215b and the pulley groove 272 at an angel of about 90 degrees to direct the cable 218 from guide-in portion 215b (y-axis direction) toward the pulley groove 272 (x-axis direction). As shown in FIG. 15, the pulley 270 changes the direction of the cable 218 curved by the arcuate projection 246b, by about 180 degrees to direct the cable 180 toward the drive unit 221.

The case cover 250 is assembled together with the case body 240 to form the pulley case CA, and is made into a given shape by injection molding a resin material, such as plastic. The case cover 250 closely covers up the case body 240, and has a second pulley housing portion 251, as shown in FIGS. 17A and 17B. Similar to the first pulley housing portion 244 of the case body 240 (see FIGS. 16A and 16B), the second pulley housing portion 251 is made into an almost cylindrical shape reduced in thickness in the thickness direction of the case cover 250. The second pulley housing portion 251 has a bottom 251a with a through-hole 251b formed in its approximate center such that the through-hole 251b penetrates the case cover 250 in its thickness direction. The pulley shaft 260 is put through the through-hole 251b when the second pulley housing portion 251 and the first pulley housing portion 244 are mated with each other.

The case cover 250 has a pair of screw holes 252 formed to be counter to each other across the second pulley housing portion 251. The fixing screws FS (see FIGS. 14 and 18) for fixing the case cover 250 to the case body 240 are screwed in the screw holes 252, respectively. The case cover 250 also has a second cap fitting portion 253 in which the cap 229 (see FIG. 14) is fitted, and a second lead-in/guide-in portion 254 that provides a guide track along which the cable 218 from the guide-in portion 215b is lead into the second pulley housing portion 251.

The second cap fitting portion 253 is counter to the first cap fitting portion 245 of the case body 240 (see FIGS. 16A and 16B), and when the pulley apparatus 220 is fixed to the vehicle body panel 211a, is directed toward the drive unit 221 in the same manner as the first cap fitting portion 245. On the interior of the second cap fitting portion 253, that is, on the opposite side to the case body 240, a second stepped portion 253a is formed to project inward from the interior of the second cap fitting portion 253. The cap 229 is engaged with the second stepped portion 253a in the same manner as engaged with the first stepped portion 245a of the case body 240.

As shown in FIG. 17B, the second lead-in/guide-in portion 254 is so formed as to project on the side of case cover 250 on which the second pulley housing portion 251 is foiled, along the thickness direction of the case cover 250. The second lead-in/guide-in portion 254 has an arcuate recession 254a recessed toward the second pulley housing portion 251. As shown in FIG. 15, the arcuate recession 254a is set counter to the arcuate projection 246b across a given gap when the case cover 250 is attached to the case body 240.

The gap between the arcuate recession 254a and the arcuate projection 246b is set to be larger than the diameter of the cable 218, so that the cable 218 does not come in sliding contact with the surface of the arcuate recession 254a when the pulley apparatus 220 operates. In this manner, by setting the arcuate recession 254a counter to the arcuate projection 246b, the cable 218 is inserted in easily between the arcuate recession 254a and the arcuate projection 246b. This improves efficiency in attaching the cable 218 into the pulley apparatus 220.

As shown in FIG. 15, the seal cover 280 is made into a given shape by injection molding an elastic material, such as rubber, and has an attachment body portion 281, a panel adhesion portion 282, and a bellows portion 283. The attachment body portion 281 is attached to the first lead-in/guide-in portion 246, and the panel adhesion portion 282 is adhered to the vehicle body panel 211a. The cable 218 is in sliding contact with the bellows portion 283, which swings freely by elastically defaming relative to the attachment body portion 281 and the panel adhesion portion 282. The seal cover 280 provided in this manner prevents incoming rainwater, dust, etc., from entering the pulley apparatus 220 from the outside of the compartment. As a result, grease (not shown) applied between the pulley shaft 260 and the pulley 270 is preserved for a long period to allow the pulley 270 to operate smoothly.

Figure 18:
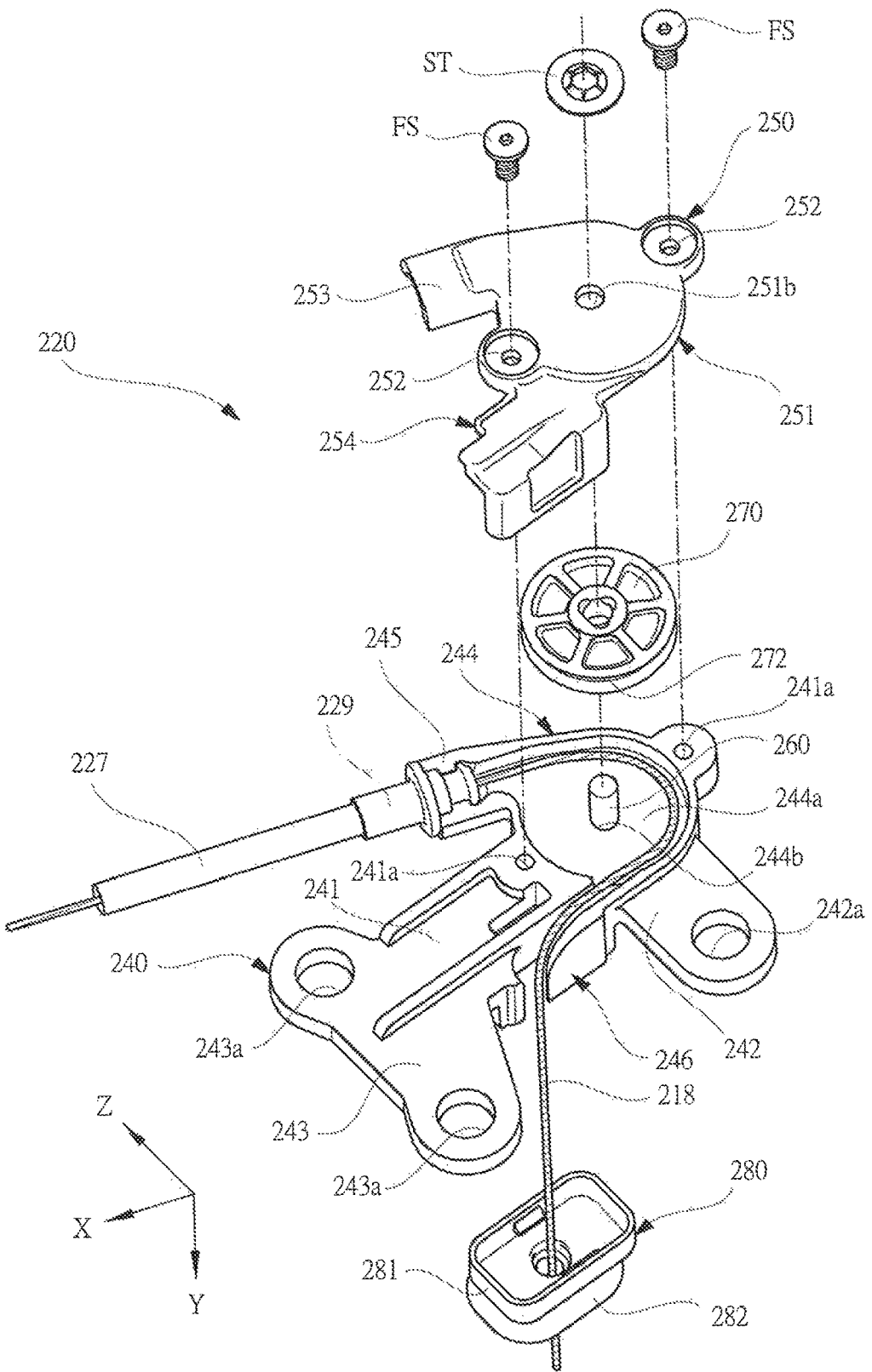
FIG. 18 is an exploded perspective view showing and explaining an assembling sequence of the pulley apparatus.

An assembling procedure for the pulley apparatus 220 constructed in the above manner will then be described in detail, referring to drawings. FIG. 18 is an exploded perspective view for explaining the assembling procedure for the pulley apparatus.

First, as shown in FIG. 18, the base end of the pulley shaft 260 (lower side in FIG. 18) is press fitted to a given extent in the through-hole 244b formed on the bottom 244a of the case body 240 and is fixed to the through-hole 244b. Subsequently, the cap 229 holding the cable 218 inserted therein is fitted to the cap fitting portion 245. Then, the cable 218 is laid along the pulley groove 272 of the pulley 270 and the pulley 270 is fitted on the pulley shaft 260 such that the pulley 270 is supported rotatably on the pulley shaft 260. At this time, grease is applied to a sliding part between the pulley shaft 260 and the pulley 270.

Subsequently, the case cover 250 is prepared, and the second pulley housing portion 251 of the case cover 250 and the first pulley housing portion 244 of the case body 240 are set counter to each other. The case cover 250 is then faced toward the case body 240, and the front end of the pulley shaft 260 (upper side in FIG. 18) is fitted in the through-hole 251b formed on the bottom 251a of the case cover 250 (see FIG. 17B). At this time, the arcuate projection 246b of the case body 240 and the arcuate recession 254a of the case cover 250 are set counter to each other (see FIG. 15), and the cable 218 is laid between them, and then the screw holes 241a of the case body 240 and the screw holes 252 of the case cover 250 are set counter to each other, respectively.

Subsequently, the fixing screws FS are put through the screw holes 252 and are screwed in the screw holes 241a, respectively, using a fastening tool (not shown). Then, a stopper ring ST is fitted on the front end of the pulley shaft 260. Hence the case body 240 is fitted completely to the case cover 250. Following this, as the cable 218 is already inserted in the bellows portion 283 of the seal cover 280 (see FIG. 15), the attachment body portion 281 of the seal cover 280 is attached to the first lead-in/guide-in portion 246 of the case body 246. Hence the pulley apparatus 220 is completed. The slide door opening and closing mechanism 216 (see FIG. 12) including the pulley apparatus 220 is mounted on a given part of the vehicle 210 by a vehicle manufacturer.

When the cable 218 is replaced with a new one in maintenance work carried out after assembling the pulley apparatus 220, for example, the pulley apparatus 220 does not need to be disassembled. The existing cable 218 is pulled out of the pulley apparatus 220 and the new cable 218 is placed in the pulley apparatus 220 from the bellows portion 283 side or the cap 229 side. In this manner, the cable 218 can be replaced easily.

Specifically, when the new cable 218 is placed in from the bellows portion 283 side, an end of the cable 218 is put through the bellows portion 283. As a result, the end of the cable 218 is guided along the arcuate recession 254a (see FIG. 15) to head for the pulley 270. The end of the cable 218 then moves along the interiors of the first pulley housing portion 244 and the second pulley housing portion 251 and is put through the cap 229.

When the new cable 218 is placed in from the cap 229 side, the end of the cable 218 is put through the cap 229. This causes the end of the cable 218 to move along the interiors of the first pulley housing portion 244 and the second pulley housing portion 251. The end of the cable 218 is then guided along the arcuate recession 254a (see FIG. 15) to head for the bellows portion 283 and is finally put through the bellows portion 283.

As described above, according to the pulley apparatus 220 of this embodiment, in the pulley case CA, the pulley shaft 260 is so disposed as to extend in the width direction of the vehicle 210 and the pulley 270 is supported rotatably on the pulley shaft 260. The pulley case CA is provided with the arcuate projection 246b which curves the cable 218 guided into the pulley case CA to direct the cable 218 toward the pulley groove 272. As a result, the radial direction of the pulley 270 is matched to the front-to-rear direction of the vehicle 210 which crosses the vehicle width direction of the vehicle 210. Hence the width dimension of the peripheral part surrounding the guide-in portion 215b of the slide door opening and closing mechanism 216 is reduced. The pulley apparatus 220, therefore, can be applied easily to a small-sized vehicle, such as light vehicle.

According to the pulley apparatus 220 of this embodiment, since the cable 218 is in sliding contact with the surface of the arcuate projection 246b, the cable 218 guided into the pulley case CA is guided smoothly toward the pulley groove 272. This suppresses an increase in the tractive resistance of the cable 218, thus preventing application of a large load to the drive unit 221 which pulls the cable 218.

According to the pulley apparatus 220 of this embodiment, the pulley case CA is composed of the case body 240 fixed to the vehicle body panel 211a and the case cover 250 closely covering up the case body 240. The case body 240 has the arcuate projection 246b, while the case cover 250 has the arcuate recession 254a formed on its part counter to the arcuate projection 246b, the arcuate recession 254a guiding the cable 218 along the arcuate projection 246b. This configuration facilitates insertion of the cable 218 in between the arcuate projection 246b and the arcuate recession 254a, thereby improves efficiency in attaching the cable 218 to the pulley apparatus 220.

According to the pulley apparatus 220 of this embodiment, the radius of curvature "R1" of the arcuate projection 246b is set to be equal to the radius of curvature "R2" of the pulley groove 272 (R1=R2). This prevents excessive bending of the cable 218 and an unnecessary increase in the size of the pulley case CA.

According to the pulley apparatus 220 of this embodiment, the position of top T of the arcuate projection 246b along the axial direction of the pulley shaft 260 is set to be the position at which the arcuate projection 246b guides the cable 218 to the central position C of the pulley groove 272 along the axial direction of the pulley shaft 260. This allows the cable 218 to be guided from the arcuate projection 246b to the normal position of the pulley groove 272. As a result, the cable 218 hardly comes in slide contact with part of the pulley 270 other than the pulley groove 272 (flanges 271, etc.), which suppresses the partial wear, etc., of the pulley 270 caused by its contact with the cable 218. In addition, the cable 218 is moved smoothly. As a result, noise emission is suppressed and application of a large load to the drive unit 221 is surely prevented.

According to the pulley apparatus 220 of the present invention, the cable guide is disposed closer to the pulley than the fitting portion of the pulley case along the vehicle body panel for fitting the pulley case to the vehicle body panel. Forming the fitting portion of the pulley case closer to the pulley, therefore, becomes unnecessary.

According to the pulley apparatus 20 of the first embodiment, the pulley 80 is disposed in the pulley case CA such that the axial direction of the pulley 80 matches the thickness direction of the vehicle body panel 11a. As a result, the pulley apparatus 20 can be disposed compactly along the vehicle body panel without widely projecting from the vehicle body panel 11a.

The present invention is not limited to the above embodiments and may be modified into various forms on the condition that the modification does not deviate from the substance of the invention. For example, in the above embodiments, the present invention applies to the pulley apparatus 220 of the slide door opening and closing mechanism 216 which opens and closes the right slide door 213 of the vehicle 210. The present invention, however, may apply also to the (front-side/rear-side) pulley apparatuses of the slide door opening and closing mechanism which opens and closes the left slide door (not shown) of the vehicle 210.

The present invention is available for a pulley apparatus which forms part of a slide door opening and closing mechanism for opening and closing a slide door disposed on one side of a vehicle, and which converts the pulling direction of a cable which pulls the slide door.

While the present invention has been illustrated and described with respect to a particular embodiment thereof, it should be appreciated by those of ordinary skill in the art that various modifications to this invention ma be made without departing from the spirit and scope of the present.

What is claimed is:

1. A pulley apparatus forming part of a slide door opening and closing mechanism for opening and closing a slide door disposed on one side of a vehicle, the slide door opening and closing mechanism includes a cable which is connected to the slide door, the pulley apparatus comprising:
   a pulley case disposed on an inner side of a body panel of the vehicle in a width direction of the vehicle, the vehicle body panel forming part of the vehicle, the pulley case having a case body and a case cover fixing the case body to the vehicle body panel, the case body having a guide fitting portion and a cable lead-in slot extending to the guide fitting portion;
   a pulley rotatably disposed in the pulley case; and
   a cable guide made of metal and disposed on the guide fitting portion, the cable guide guiding the cable to the inner side of the vehicle body panel from an outer side of the vehicle body panel, and vice versa, the cable guide being in sliding contact with the cable and guiding the cable along the vehicle body panel to direct the cable to the pulley;
   wherein the case body and the case cover are formed with fitting holes in which ends of a pulley shaft for rotatably supporting the pulley are fitted;

wherein each of the case body and the case cover are formed with engagement portions, and the case cover is attached to the case body via the engagement portions, wherein the case cover has a pair of fitting portions which abut the vehicle body panel and are directly fixed to the vehicle body panel with fastening bolts, and wherein the cable forces the case body against the vehicle body panel when the cable is tensioned.

2. The pulley apparatus according to claim 1, wherein the pulley shaft extends in the vehicle width direction.

3. The pulley apparatus according to claim 2, wherein the cable guide guides the cable toward a center of a pulley groove of the pulley.

4. The pulley apparatus according to claim 2, wherein the cable guide is disposed closer to the pulley than to at least one of the pair of fitting portions.

5. The pulley apparatus according to claim 2, wherein the case body is covered by the case cover and held between the case cover and the vehicle body panel, the cable guide is an arcuate projection formed on the case body, and an arcuate recession which guides the cable along the arcuate projection is formed on the case cover.

6. The pulley apparatus according to claim 1, wherein the pulley has a pulley groove into which the cable is guided, and the cable guide guides the cable to a central portion of the pulley groove of the pulley.

7. The pulley apparatus according to claim 6, wherein the cable guide is disposed closer to the pulley than to at least one of the pair of fitting portions.

8. The pulley apparatus according to claim 6, wherein the case body is covered by the case cover and held between the case cover and the vehicle body panel, the cable guide is an arcuate projection formed on the case body, and an arcuate recession which guides the cable along the arcuate projection is formed on the case cover.

9. The pulley apparatus according to claim 1, wherein the cable guide is disposed closer to the pulley than to at least one of the pair of fitting portions.

10. The pulley apparatus according to claim 1, wherein the case body is covered by the case cover and held between the case cover and the vehicle body panel, the cable guide is an arcuate projection formed on the case body, and an arcuate recession which guides the cable along the arcuate projection is formed on the case cover.

11. The pulley apparatus according to claim 10, wherein a radius of curvature of the arcuate projection is equal to a radius of curvature of a pulley groove of the pulley.

12. The pulley apparatus according to claim 1, wherein the engagement portions of the case body are projections extending in the width direction, and the engagement portions of the case cover are claws which are respectively engaged with the projections of the case body.

13. The pulley apparatus according to claim 1, further comprising a seal cover made of elastic material, the seal cover having:

an attachment body portion which is attached to the cable lead-in slot of the case body;

a panel adhesion portion which is adhered to the vehicle body panel so as to cover an opening of the vehicle body panel; and a hollow bellows portion which extends through the opening of the vehicle body panel, wherein the cable extends through and comes in sliding contact with the bellows portion.

* * * * *